US009495756B2

(12) United States Patent
Rivet-Sabourin

(10) Patent No.: US 9,495,756 B2
(45) Date of Patent: Nov. 15, 2016

(54) MULTI-SCALE ACTIVE CONTOUR SEGMENTATION

(71) Applicant: LABORATOIRES BODYCAD INC., Québec (CA)

(72) Inventor: Geoffroy Rivet-Sabourin, Stoneham (CA)

(73) Assignee: LABORATOIRES BODYCAD INC., Quebec, Quebec (CA)

( * ) Notice: Subject to any disclaimer, the term of this patent is extended or adjusted under 35 U.S.C. 154(b) by 0 days.

(21) Appl. No.: 14/782,731

(22) PCT Filed: Apr. 9, 2014

(86) PCT No.: PCT/CA2014/000341
§ 371 (c)(1),
(2) Date: Oct. 6, 2015

(87) PCT Pub. No.: WO2014/165973
PCT Pub. Date: Oct. 16, 2014

(65) Prior Publication Data
US 2016/0093060 A1 Mar. 31, 2016

Related U.S. Application Data

(60) Provisional application No. 61/809,941, filed on Apr. 9, 2013.

(51) Int. Cl.
*G06K 9/00* (2006.01)
*G06T 7/00* (2006.01)
(Continued)

(52) U.S. Cl.
CPC ........... *G06T 7/0083* (2013.01); *G06T 3/4053* (2013.01); *G06T 5/002* (2013.01); *G06T 7/004* (2013.01);
(Continued)

(58) Field of Classification Search
None
See application file for complete search history.

(56) References Cited

U.S. PATENT DOCUMENTS 6,078,688 A 6/2000 Cox et al.
7,043,290 B2 * 5/2006 Young ................... G06T 7/0083
382/173
(Continued)

OTHER PUBLICATIONS

Schnabel, Julia A., and Simon R. Arridge. "Active shape focusing." Image and Vision Computing 17.5 (1999): 419-428 (correspond to attached document pp. 1-10).*

(Continued)

*Primary Examiner* — Vu Le
*Assistant Examiner* — Samah Beg
(74) *Attorney, Agent, or Firm* — Sutherland Asbill & Brennan LLP

(57) ABSTRACT

A system and method for active contour segmentation where an image for a structure and an initial position on the image are received, a multi-scale image representation comprising successive image levels each having associated therewith a representation of the image is computed, a representation of the image at a given level having a different image resolution than that of a representation of the image at a subsequent level, a given one of the levels at which noise in the image is removed is identified, the initial position is set as a current contour and the given level as a current level, the current contour is deformed at the current level to expand into an expanded contour matching a shape of the structure, the expanded contour is set as the current contour and the subsequent level as the current level, and the steps are repeated until the last level is reached.

21 Claims, 19 Drawing Sheets

(51) Int. Cl.
*G06T 3/40* (2006.01)
*G06T 5/00* (2006.01)

(52) U.S. Cl.
CPC ........... *G06T 7/0089* (2013.01); *G06T 7/0097* (2013.01); *G06T 2207/20016* (2013.01); *G06T 2207/20116* (2013.01)

(56) References Cited

U.S. PATENT DOCUMENTS

| | | | |
|---|---|---|---|
| 7,587,073 B2 | 9/2009 | Park | |
| 7,925,064 B2* | 4/2011 | Cloutier | A61B 5/02007 |
| | | | 382/128 |
| 7,925,087 B2 | 4/2011 | Slabaugh et al. | |
| 7,929,739 B2* | 4/2011 | Li | G06K 9/34 |
| | | | 382/128 |
| 7,953,266 B2* | 5/2011 | Gulsun | G06K 9/4638 |
| | | | 382/131 |
| 8,031,919 B2* | 10/2011 | Eskildsen | G06K 9/48 |
| | | | 128/922 |
| 8,160,345 B2 | 4/2012 | Pavlovskaia et al. | |
| 8,253,802 B1 | 8/2012 | Anderson et al. | |
| 8,401,305 B2* | 3/2013 | Kido | G06K 9/6253 |
| | | | 382/199 |
| 8,406,527 B2* | 3/2013 | Kido | G06K 9/6202 |
| | | | 382/189 |
| 8,515,171 B2* | 8/2013 | Vantaram | G06T 7/0081 |
| | | | 382/164 |
| 8,995,790 B2* | 3/2015 | Mueller | G06T 3/0068 |
| | | | 348/79 |
| 9,122,951 B2* | 9/2015 | Lee | G06K 9/0014 |
| 9,336,587 B2* | 5/2016 | Shibahara | G06T 7/0004 |
| 2005/0111732 A1 | 5/2005 | Mallya et al. | |
| 2008/0044072 A1 | 2/2008 | Kiraly et al. | |
| 2008/0112617 A1 | 5/2008 | Slabaugh et al. | |
| 2009/0190815 A1 | 7/2009 | Dam et al. | |
| 2010/0153081 A1 | 6/2010 | Bellettre et al. | |
| 2011/0123090 A1 | 5/2011 | Zerfass et al. | |
| 2011/0262054 A1 | 10/2011 | Benson et al. | |
| 2013/0033419 A1* | 2/2013 | Dror | G06T 7/0083 |
| | | | 345/156 |
| 2015/0030219 A1* | 1/2015 | Madabhushi | G06T 7/0083 |
| | | | 382/128 |
| 2015/0302601 A1* | 10/2015 | Rivet-Sabourin | G01R 33/5608 |
| | | | 382/131 |
| 2015/0324999 A1* | 11/2015 | Gritsenko | G06T 7/0097 |
| | | | 382/132 |
| 2016/0070973 A1* | 3/2016 | Rivet-Sabourin | G06T 7/0083 |
| | | | 382/199 |

OTHER PUBLICATIONS

Papari, Giuseppe, et al. "A biologically motivated multiresolution approach to contour detection." EURASIP Journal on Applied Signal Processing (2007), 28 pages.*

Pohle et al., Segmentation of medical images using adaptative region growing, SPIE Proceedings, vol. 4322, Medical Imaging 2001: Image Processing, 1337, Jul. 3, 2001.

Mao et al., Color image segmentation method based on region growing and ant colony clustering, WRI Global Congress on Intelligent Systems, p. 173-177, May 19, 2009.

Tilton, J.C., Image segmentation by region growing and spectral clustering with a neural convergence criterion, Proceedings of the 1998 Geoscience and remote sensing symposium (ICGARSS. '98) Jul. 6, 1998.

* cited by examiner

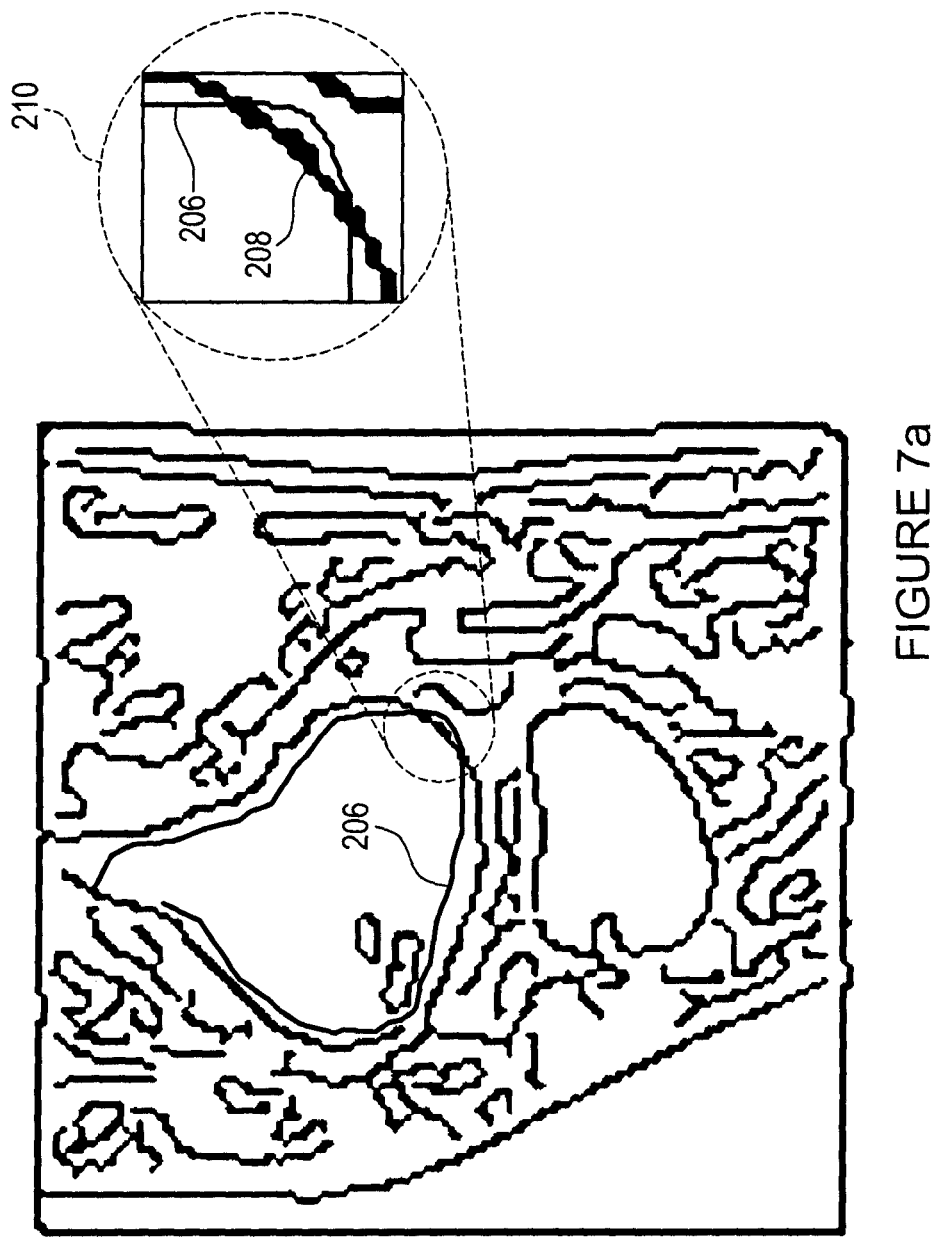

MULTI-SCALE ACTIVE CONTOUR SEGMENTATION

CROSS-REFERENCE TO RELATED APPLICATIONS

This patent application claims priority of U.S. provisional Application Ser. No. 61/809,941, filed on Apr. 9, 2013.

TECHNICAL FIELD

The present invention relates to the field of image segmentation, and more particularly, to active contour segmentation.

BACKGROUND OF THE ART

When creating customized and anatomically correct prostheses for the body, all relevant components of an anatomical structure, e.g. an articulation, are to be segmented with high precision. For this purpose, active contour segmentation may be used. Precise segmentation in turn ensures that the resulting prostheses accurately fit the unique shape and size of the anatomical structure. Still, the presence of noise in images of the anatomical structure remains a challenge. Indeed, noise can significantly reduce the accuracy and efficiency of the segmentation process, proving highly undesirable.

There is therefore a need to improve on existing image segmentation techniques.

SUMMARY

In accordance with a first broad aspect, there is described a computer-implemented method for active contour segmentation of imaging data, the method comprising (a) receiving at least one image for a given structure and obtaining an initial position on the image; for each one of the at least one image, (b) computing a multi-scale image representation comprising a plurality of successive image levels each having associated therewith a representation of the image, a representation of the image at a given one of the plurality of successive image levels having a different image resolution than that of a representation of the image at a subsequent one of the plurality of successive image levels; (c) identifying a given one of the image levels at which noise in the image is substantially removed; (d) setting the initial position as a current contour and the given image level as a current image level; (e) deforming the current contour at the current image level to expand into an expanded contour matching a shape of the given structure; (f) setting the expanded contour as the current contour and the subsequent one of the plurality of image levels as the current image level; and (g) repeating steps (e) and (f) until a last one of the plurality of image levels is reached.

In some embodiments, identifying the given one of the image levels comprises (h) identifying a selected representation of the image associated with a selected one of the plurality of image levels and at which the image resolution is highest; (i) defining a region of interest within the selected representation of the image; (j) performing image sample analysis to determine whether noise is present within the region of interest; (k) if no noise is present within the region of interest, determining that the selected image level is adequate for initiating contour deformation thereat and setting the selected image level as the given one of the image levels; and (l) otherwise, selecting another one of the plurality of image levels having a lower image resolution than that of the selected image level, setting the other one of the plurality of image levels as the selected image level, and repeating steps (i) to (l) until the last one of the plurality of image levels is reached.

In some embodiments, defining the region of interest within the selected representation of the image comprises extending a plurality of sampling rays radially away from the initial position; identifying intersection points between the plurality of sampling rays and edges present in the selected representation of the image; computing a distance between each one of the intersection points and the initial position and comparing the distance to a first threshold; removing from the selected representation of the image ones of the intersection points whose distance is beyond the first threshold and retaining other ones of the intersection points; fitting a sampling circle on retained ones of the intersection points; discriminating between ones of the edges representative of noise in the selected representation of the image and ones of the edges delimiting a boundary of the given structure in the selected representation of the image; removing ones of the intersection points that lie on the edges delimiting the boundary of the given structure; and resizing the sampling circle for only retaining therein the intersection points that lie on the edges representative of noise, the region of interest defined as an area within the resized sampling circle.

In some embodiments, performing image sample analysis comprises assessing whether one or more of the edges are present inside the resized sampling circle; if no edges are present inside the resized sampling circle, determining that no noise is present within the region of interest; otherwise, if one or more of the edges are present inside the resized sampling circle, for each one of the one or more edges present, computing an angular distance of the edge, computing a length of the edge, computing a ratio of the length to the angular distance, comparing the computed ratio to a threshold ratio, retaining the edge within the resized sampling circle if the computed ratio is below the threshold ratio, and otherwise removing the edge from within the resized sampling circle, assessing whether edges remain inside the resized sampling circle, if edges remain inside the resized sampling circle, determining that noise is present within the region of interest, and otherwise, determining that no noise is present within the region of interest.

In some embodiments, the method further comprises, after setting the expanded contour as the current contour and the subsequent one of the plurality of image levels as the current image level and prior to the deforming, projecting the expanded contour set as the current contour onto the representation of the image associated with the subsequent image level set as the current image level, the deforming comprising deforming the projected expanded contour in the representation of the image associated with the subsequent image level set as the current image level.

In some embodiments, the method further comprises, after setting the expanded contour as the current contour and the subsequent one of the plurality of image levels as the current image level and prior to the deforming, identifying one or more noisy edges present inside the current contour, the one or more noisy edges representative of noise introduced in the image as a result of the projecting; and removing the one or more noisy edges.

In some embodiments, the method further comprises, after setting the expanded contour as the current contour and the subsequent one of the plurality of image levels as the current image level and prior to the deforming identifying one or more boundary edges delimiting a boundary of the given structure in the image; sampling the current contour to obtain a pixel-connected contour comprising a plurality of neighboring points; determining, for each one of the plurality of neighboring points, whether the neighboring point overlaps any one of the one or more boundary edges; and if the point overlaps, moving the point away from the one or more boundary edges along a direction of a normal to the current contour, thereby eliminating the overlap.

In some embodiments, deforming the current contour at the current image level comprises computing a value of a gradient force at each point on the current contour; computing a distance between each point on the current contour and one or more edges present in the image; comparing the distance to a third threshold; if the distance is lower than the third threshold, using the gradient force to displace the current contour; and otherwise, using a force normal to the current contour at each point along the current contour to displace the current contour.

In some embodiments, using the normal force to displace the current contour comprises determining a displacement direction of each point along the current contour; for each point along the current contour, identifying ones of the one or more edges present in the displacement direction; discriminating between ones of the one or more edges present in the displacement direction that delineate a boundary of the given structure and ones of the one or more edges present in the displacement direction and representative of noise in the image; and adjusting the normal force in accordance with the distance between each point along the current contour and the one or more edges present in the displacement direction such that a displacement magnitude of the point in the displacement direction causes the current contour to be displaced beyond the one or more edges present in the displacement direction and representative of noise.

In some embodiments, the method further comprises computing a spacing between the one or more edges present in the displacement direction, comparing the spacing to a tolerance, and, if the spacing is below the tolerance, adjusting the normal force such that the displacement magnitude of the point in the displacement direction prevents the current contour from entering the spacing between the one or more edges.

In some embodiments, obtaining the initial position comprises one of randomly determining a point inside a boundary of the given structure in the image and receiving a user-defined selection of the initial position.

In accordance with a second broad aspect, there is described a system for active contour segmentation of imaging data, the system comprising a memory; a processor; and at least one application stored in the memory and executable by the processor for (a) receiving at least one image for a given structure and obtaining an initial position on the image; for each one of the at least one image, (b) computing a multi-scale image representation comprising a plurality of successive image levels each having associated therewith a representation of the image, a representation of the image at a given one of the plurality of successive image levels having a different resolution than that of a representation of the image at a subsequent one of the plurality of successive image levels; (c) identifying a given one of the image levels at which noise in the image is substantially removed; (d) setting the initial position as a current contour and the given image level as a current image level; (e) deforming the current contour at the current image level to expand into an expanded contour matching a shape of the given structure; (f) setting the expanded contour as the current contour and the subsequent one of the plurality of image levels as the current image level; and (g) repeating steps (e) and (f) until a last one of the plurality of image levels is reached.

In some embodiments, the at least one application is executable by the processor for identifying the given one of the image levels comprising (h) identifying a selected representation of the image associated with a selected one of the plurality of image levels and at which the image resolution is highest; (i) defining a region of interest within the selected representation of the image associated with the selected image level; (j) performing image sample analysis to determine whether noise is present within the region of interest; (k) if no noise is present within the region of interest, determining that the selected image level is adequate for initiating contour deformation thereat and setting the selected image level as the given one of the image levels; and (l) otherwise, selecting another one of the plurality of image levels having a lower image resolution than that of the selected image level, setting the other one of the plurality of image levels as the selected image level, and repeating steps (i) to (l) until the last one of the plurality of image levels is reached.

In some embodiments, the at least one application is executable by the processor for defining the region of interest within the representation of the image comprising extending a plurality of sampling rays radially away from the initial position; identifying intersection points between the plurality of sampling rays and edges present in the selected representation of the image; computing a distance between each one of the intersection points and the initial position and comparing the distance to a first threshold; removing from the selected representation of the image ones of the intersection points whose distance is beyond the first threshold and retaining other ones of the intersection points; fitting a sampling circle on retained ones of the intersection points; discriminating between ones of the edges representative of noise in the selected representation of the image and ones of the edges delimiting a boundary of the given structure in the selected representation of the image; removing ones of the intersection points that lie on the edges delimiting the boundary of the given structure; and resizing the sampling circle for only retaining therein the intersection points that lie on the edges representative of noise, the region of interest defined as an area within the resized sampling circle.

In some embodiments, the at least one application is executable by the processor for performing image sample analysis comprising assessing whether one or more of the edges are present inside the resized sampling circle; if no edges are present inside the resized sampling circle, determining that no noise is present within the region of interest; otherwise, if one or more of the edges are present inside the resized sampling circle, for each one of the one or more edges present, computing an angular distance of the edge, computing a length of the edge, computing a ratio of the length to the angular distance, comparing the computed ratio to a threshold ratio, retaining the edge within the resized sampling circle if the computed ratio is below the threshold ratio, and otherwise removing the edge from within the resized sampling circle, assessing whether edges remain inside the resized sampling circle, if edges remain inside the resized sampling circle, determining that noise is present within the region of interest, and otherwise, determining that no noise is present within the region of interest.

In some embodiments, the at least one application is executable by the processor for, after setting the expanded contour as the current contour and the subsequent one of the plurality of image levels as the current image level and prior to the deforming, projecting the expanded contour set as the current contour onto the representation of the image associated with the subsequent image level set as the current image level, the deforming comprising deforming the projected expanded contour in the representation of the image associated with the subsequent image level set as the current image level.

In some embodiments, the at least one application is executable by the processor for, after setting the expanded contour as the current contour and the subsequent one of the plurality of image levels as the current image level and prior to the deforming, identifying one or more noisy edges present inside the current contour, the one or more noisy edges representative of noise introduced in the image as a result of the projecting; and removing the one or more noisy edges.

In some embodiments, the at least one application is executable by the processor for, after setting the expanded contour as the current contour and the subsequent one of the plurality of image levels as the current image level and prior to the deforming identifying one or more boundary edges delimiting a boundary of the given structure in the image; sampling the current contour to obtain a pixel-connected contour comprising a plurality of neighboring points; determining, for each one of the plurality of neighboring points, whether the neighboring point overlaps any one of the one or more boundary edges; and if the point overlaps, moving the point away from the one or more boundary edges along a direction of a normal to the current contour, thereby eliminating the overlap.

In some embodiments, the at least one application is executable by the processor for deforming the current contour at the current image level comprising computing a value of a gradient force at each point on the current contour; computing a distance between each point on the current contour and one or more edges present in the image; comparing the distance to a third threshold; if the distance is lower than the third threshold, using the gradient force to displace the current contour; and otherwise, using a force normal to the current contour at each point along the current contour to displace the current contour.

In some embodiments, the at least one application is executable by the processor for using the normal force to displace the current contour comprising determining a displacement direction of each point along the current contour; for each point along the current contour, identifying ones of the one or more edges present in the displacement direction; discriminating between ones of the one or more edges present in the displacement direction that delineate a boundary of the given structure and ones of the one or more edges present in the displacement direction and representative of noise in the image; and adjusting the normal force in accordance with the distance between each point along the current contour and the one or more edges present in the displacement direction such that a displacement magnitude of the point in the displacement direction causes the current contour to be displaced beyond the one or more edges present in the displacement direction and representative of noise.

In some embodiments, the at least one application is executable by the processor for computing a spacing between the one or more edges present in the displacement direction, comparing the spacing to a tolerance, and, if the spacing is below the tolerance, adjusting the normal force such that the displacement magnitude of the point in the displacement direction prevents the current contour from entering the spacing between the one or more edges.

In some embodiments, the at least one application is executable by the processor for obtaining the initial position comprising one of randomly determining a point inside a boundary of the given structure in the image and receiving a user-defined selection of the initial position.

In accordance with a third broad aspect, there is described a computer readable medium having stored thereon program code executable by a processor for active contour segmentation of imaging data, the program code executable for (a) receiving at least one image for a given structure and obtaining an initial position on the image; for each one of the at least one image, (b) computing a multi-scale image representation comprising a plurality of successive image levels each having associated therewith a representation of the image, a representation of the image at a given one of the plurality of successive image levels having a different resolution than that of a representation of the image at a subsequent one of the plurality of successive image levels; (c) identifying a given one of the image levels at which noise in the image is substantially removed; (d) setting the initial position as a current contour and the given image level as a current image level; (e) deforming the current contour at the current image level to expand into an expanded contour matching a shape of the given structure; (f) setting the expanded contour as the current contour and the subsequent one of the plurality of image levels as the current image level; and (g) repeating steps (e) and (f) until a last one of the plurality of image levels is reached.

BRIEF DESCRIPTION OF THE DRAWINGS

Further features and advantages of the present invention will become apparent from the following detailed description, taken in combination with the appended drawings, in which:

FIG. 7a and FIG. 7b illustrate displacement of a contour away from edges in an edge image, in accordance with an illustrative embodiment of the present invention;

FIG. 14b is a block diagram showing an exemplary multi-scale active contour deformation module of FIG. 14a;

It will be noted that throughout the appended drawings, like features are identified by like reference numerals.

DETAILED DESCRIPTION

Figure 1:
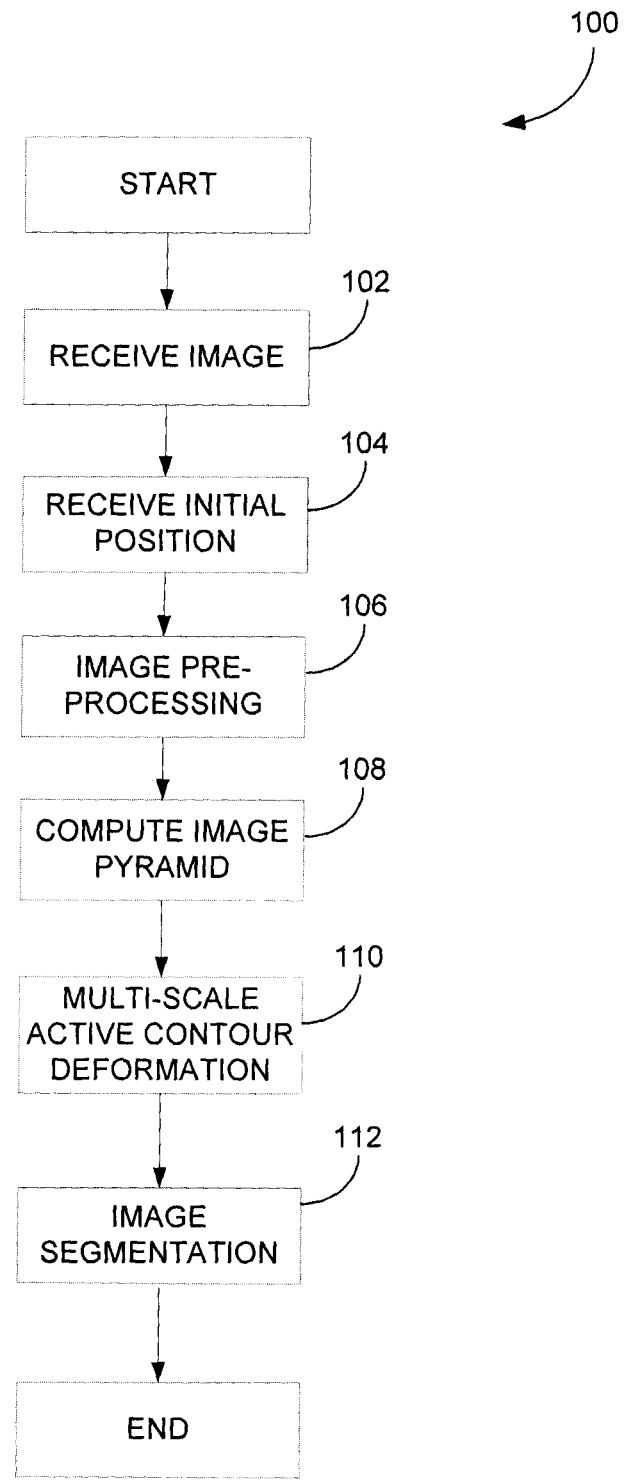
FIG. 1 is a flowchart illustrating an exemplary method for performing multi-scale active contour segmentation, in accordance with an illustrative embodiment of the present invention.

Referring to FIG. 1, a method 100 for multi-scale active contour segmentation will now be described. The method 100 may be used to segment images in order to identify structures therein. The method 100 is suitable for reducing noise, which may be present in the images. The method 100 illustratively comprises the broad steps of receiving at step 102 an image, receiving at step 104 an initial position from which the multi-scale active contour deformation will be started, pre-processing at step 106 the received image, computing at step 108 a pyramid of the image, performing at step 110 multi-scale active contour deformation, and performing at step 112 image segmentation to identify the different structures in each image slice.

The image data received at step 102 is representative of an anatomical region under study, e.g. an articulation, such as the knee region. It should be understood that more than one image may be received at step 102. When more than one image is received or more than one structure is present in a given image, the steps 104 to 112 may be repeated for all images in the image data set. For example, when image data of a knee region is received, the image data may comprise a first structure corresponding to a femur and a second structure corresponding to a tibia. A contour may be deformed for each structure using step 110. Once all images and all structures of interest have been processed, segmentation is complete. In one embodiment, the images are processed sequentially, i.e. one at a time. In alternative embodiments, the images may be processed in parallel. Parallel processing may reduce the overall time required to generate segmented data. It also prevents errors from being propagated throughout the set of image slices, should there be errors introduced in each image during any of the steps 104 to 112.

The image(s) may be obtained from scans generated using Magnetic Resonance Imaging (MRI), Computed Tomography (CT), ultrasound, x-ray technology, optical coherence tomography, or the like. The image(s) may be captured along one or more planes throughout a body part, such as sagittal, coronal, and transverse. In some embodiments, multiple orientations are performed and the data may be combined or merged during the pre-processing step 106. For example, a base set of images may be prepared on the basis of data acquired along a sagittal plane, with missing information being provided using data acquired along a coronal plane. Other combinations or techniques to optimize the use of data along more than one orientation will be readily understood by those skilled in the art. In some embodiments, a volume of data is obtained using a 3D acquisition sequence independent of an axis of acquisition. The volume of data may be sliced in any direction as desired. The image data may be provided in various known formats and using various known protocols, such as Digital Imaging and Communications in Medicine (DICOM), for handling, storing, printing, and transmitting information. Other exemplary formats are GE SIGNA Horizon LX, Siemens Magnatom Vision, SMIS MRD/SUR, and GE MR SIGNA 3/5 formats.

The step 104 of receiving an initial position may comprise receiving an initial position or starting point for contour deformation of the structure(s) to be segmented in the image (or set of images) received at step 102. In some embodiments, the initial position may be a single point or four (4) neighboring points (or pixels) around a single point. The initial position received at step 104 may be computed using an initialization algorithm that automatically determines a point inside a surface or boundary of the structure to be segmented. The initial position may alternatively be determined, e.g. marked, manually by an operator on each slice that defines the volume of the structure. Still, it is desirable for the initialization to be performed independently from other parameters. As such, any point within the structure may therefore be randomly selected for use as the initial position. Once the initial position has been received at step 104, it may be used as an initial contour that will be deformed to segment the structure of interest for each image slice.

Figure 2:
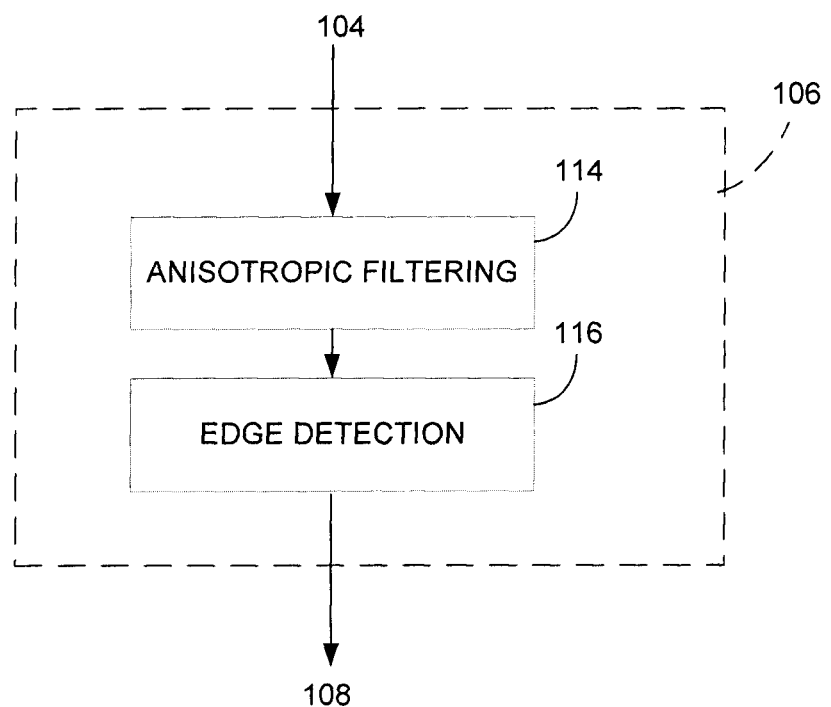
FIG. 2 is a flowchart of the step of FIG. 1 of preprocessing a received image.

FIG. 2 is an exemplary embodiment of the image pre-processing step 106. Image pre-processing 106 may comprise performing at step 114 anisotropic filtering on the images received at step 102. Such anisotropic filtering 114 may be used to decrease the noise level in the received image. Edge detection may also be performed at step 116. The edges may correspond to sudden transitions in the image gradient and may represent boundaries of objects or material properties. Edge detection 116 may be performed using the Canny method, Sobel filters, or other suitable techniques known to those skilled in the art. Subsequent to edge detection 116, an edge image is obtained, in which information that may be considered of low relevance has been filtered out while preserving the important structural properties of the original image. In particular, the edge image may comprise a set of connected curves that indicate the boundaries of image structures as well as curves that correspond to discontinuities in surface orientation.

In particular, edge detection may be performed at step 116 knowing that it is desirable for the image to comprise long edges, which are continuous and uniform in their curvature. Any other edges may then be identified as noise. Edge detection 116 may therefore comprise detecting short edges, which are then identified as noise. These short edges may then be cancelled from the image data received at step 102. Edge detection 116 may further comprise cancellation of edges according to the ratio between the length, i.e. the number of pixels, of each edge and the size of the bounding box, i.e. the image area, containing the edge. This ratio enables to detect edges having a length much greater than the size of their bounding box, i.e. edges that are folded over themselves. Such folded edges may then be identified as noise in the image and cancelled accordingly. It should be understood that at least one of cancellation of short edges and cancellation of folded edges may be performed for edge detection 116.

Referring back to FIG. 1, once the image has been pre-processed at step 106, an image pyramid may be computed at step 108 using any suitable technique known to those skilled in the art, such as Gaussian, Laplacian, or wavelet pyramid construction. As understood by those skilled in the art, image pyramids are hierarchical representations of an original image. The pyramids may be used to decompose the image into information at multiple scales, to extract features or structures of interest, and to attenuate noise. In particular, an N×N image may be represented as a pyramid of 1×1, 2×2, 4×4, . . . , $2^k \times 2^k$ images, assuming $N=2^k$, with k an integer and each image a representation of the original image. The 1×1, 2×2, 4×4, . . . , $2^k \times 2^k$ images are each associated with a level of the pyramid, with the 1×1 image being at the highest pyramid level, e.g. level 4 of a four-level pyramid, and the $2^k \times 2^k$ image at the lowest pyramid level, e.g. level 1. It should be understood that other representations may apply and that the number of pyramid levels may be varied according to design requirements. For example, the step 108 may comprise choosing the number of pyramid levels so as to provide a smooth transition from one resolution, i.e. one pyramid level, to another.

Moreover, and as will be discussed further below, by choosing, for each image being processed, an initial deformation level suitable to initiate deformation thereat, it is possible to dynamically adjust the number of pyramid levels being used during the multi-scale active contour deformation 110. For example, if the image pyramid computed at step 108 comprises four (4) levels 4, 3, 2, 1, it may be determined that contour deformation is to be performed starting from level 3, i.e. is to be performed on levels 3, 2, 1 only. As such, deformation need not be performed on all four (4) levels 4, 3, 2, 1. In another example, it may be determined that contour deformation may be initiated at level 1, i.e. that contour deformation is to be performed on level 1 only.

Figure 3:
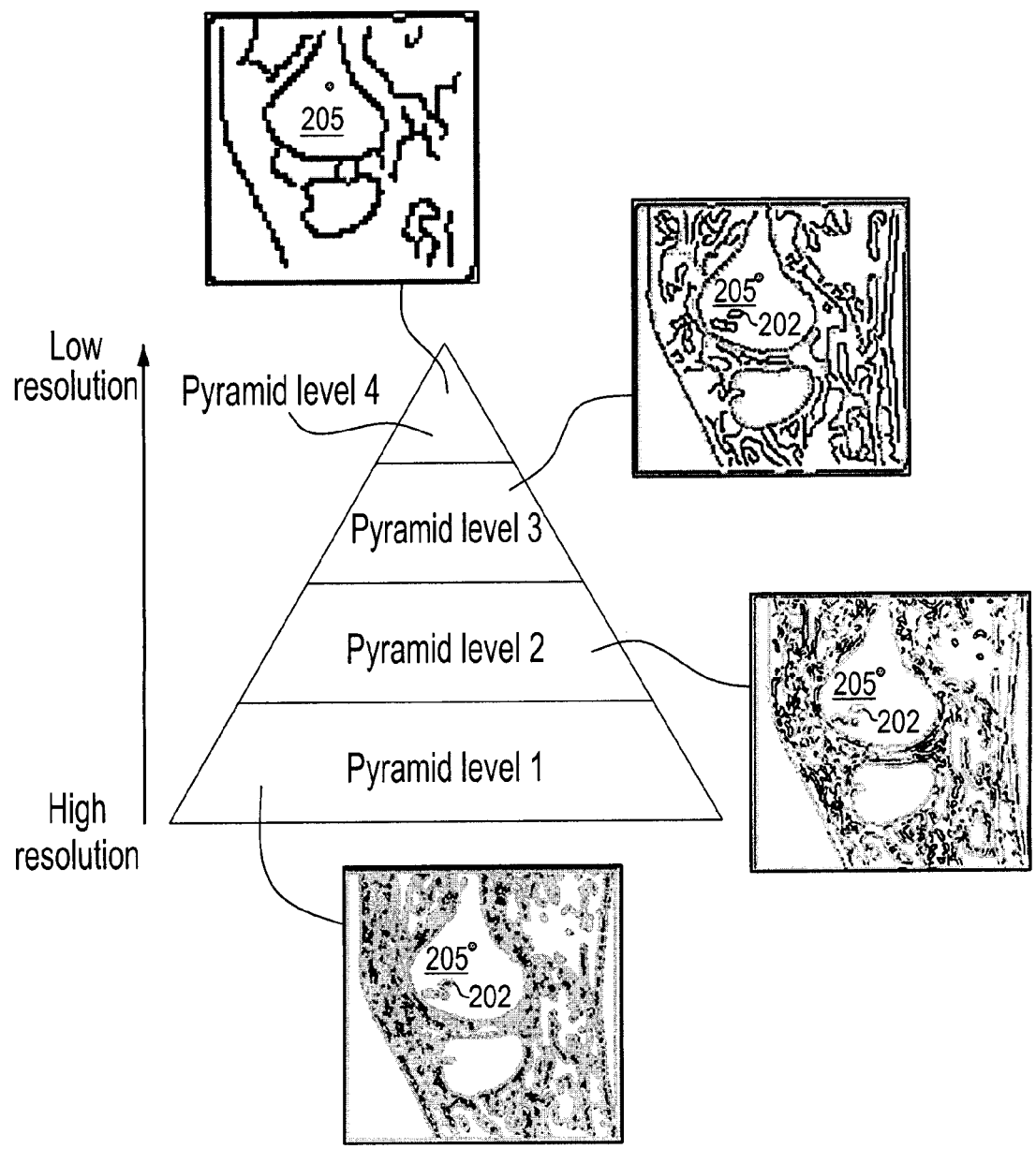
FIG. 3 illustrates a pyramid image, in accordance with an illustrative embodiment of the present invention.

The 1×1, 2×2, 4×4, $2^k \times 2^k$ images illustratively have the same image content but have difference scales or resolution. In particular, the image at the highest pyramid level, e.g. the 1×1 image, typically has a low image resolution with little to no detail being held in the image whereas the image at the lowest level, e.g. the $2^k \times 2^k$ image, has a high resolution with detail being held in the image. As can be seen in FIG. 3, the image pyramid illustratively comprises four levels each associated with an image at a given resolution. It can be seen that lower resolution images, e.g. images at the highest pyramid levels, contain less details than images at lower pyramid levels. In particular, noise 202 present in images at the lower pyramid levels, e.g. levels 1, 2, and 3, is no longer present in the image at the highest pyramid level 4.

Although reference is made for illustrative purposes to an image pyramid being computed at step 108, it should be understood that step 108 may comprise computing any other suitable hierarchical or multi-level representation of the original image. It should also be understood that the variation in image resolution from one representation of the image to the next may not be constant. Still, it is desirable to compute a multi-level representation of the original image that comprises different image representations having different image resolutions and to have knowledge of the difference in resolution.

Figure 4:
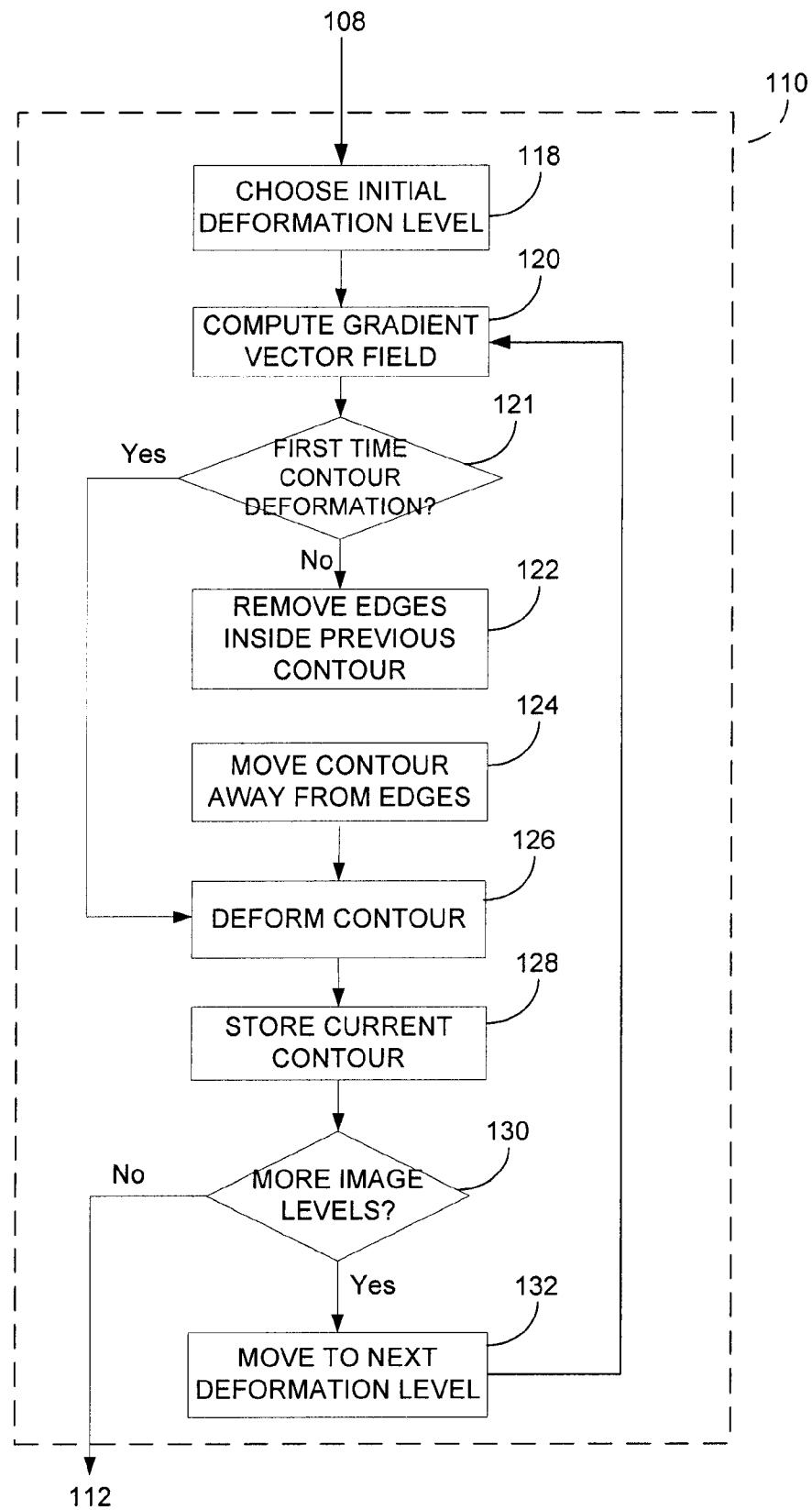
FIG. 4 is a flowchart of the step of FIG. 1 of performing multi-scale active contour segmentation.
Figure 5:
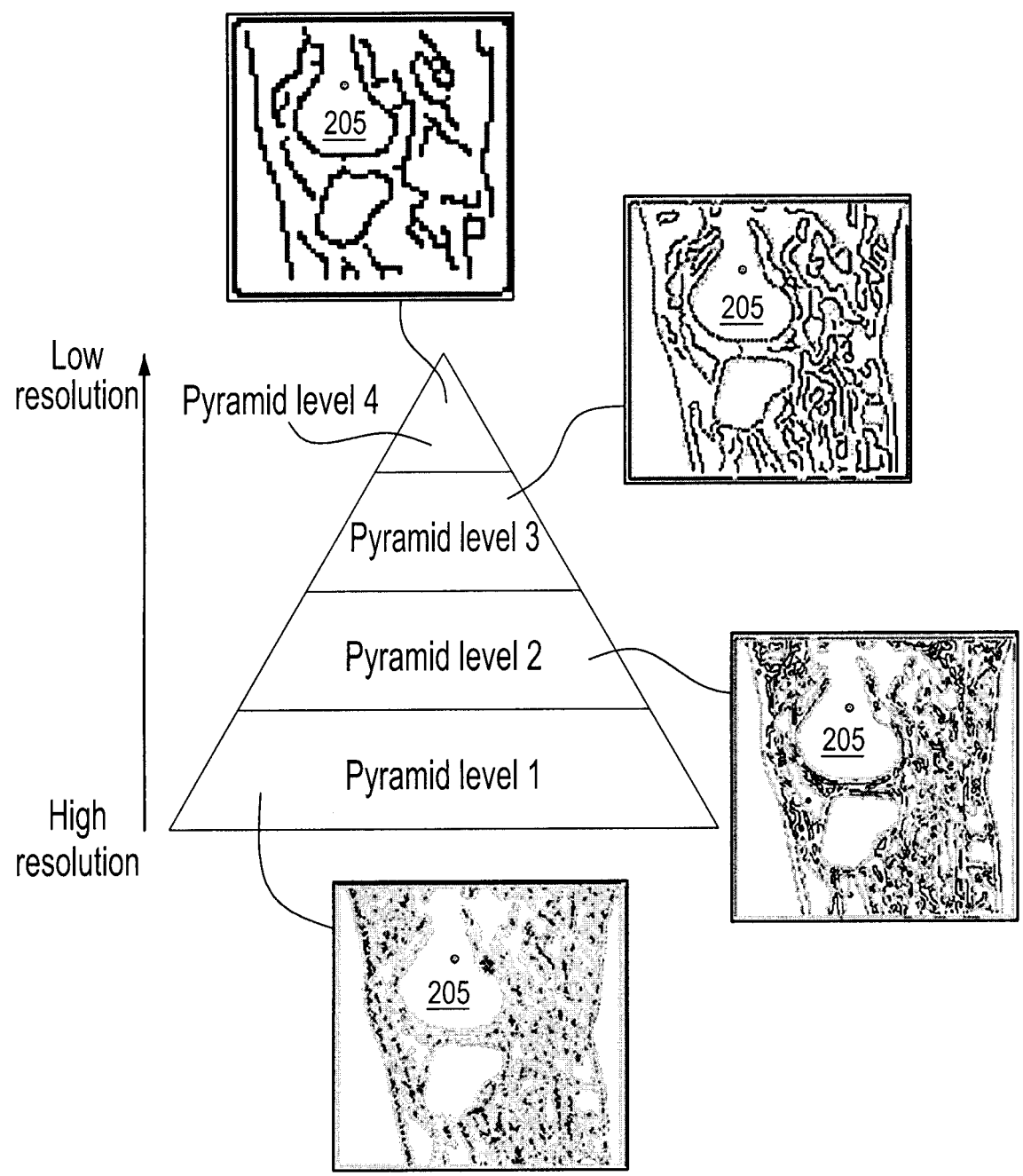
FIG. 5 illustrates a noise-free pyramid image, in accordance with an illustrative embodiment of the present invention.

Referring now to FIG. 4, the step 110 of performing multi-scale active contour deformation illustratively comprises, as will be discussed in further detail below, choosing at step 118 an initial deformation level in the image pyramid computed at step 108. In some embodiments, the initial deformation level chosen at step 118 is the level of the image having the lowest resolution, i.e. the highest pyramid level. Still, as discussed above, the lower the image resolution, the less information remaining in the image. Thus, it may be desirable to begin the multi-scale active contour deformation step 110 at the highest image level possible in order to have as much information as possible in the image being deformed. It should therefore be understood that, in some cases, the initial deformation level chosen at step 118 need not be the pyramid level corresponding to the lowest resolution image. Instead, a subsequent pyramid level corresponding to an image of higher resolution may be chosen. Indeed, in the image data received at step 102 of FIG. 1, the structure to be segmented may be free of noise. This is illustrated in FIG. 5 where, for all pyramid levels 1 to 4, the images are noise-free within the femur 205. As such, any pyramid level, e.g. pyramid level 2, may be chosen as the initial deformation level. By choosing a pyramid level other than the level having the lowest resolution, loss of information can be reduced and the efficiency of the contour deformation process increased. In contrast, the images illustrated in FIG. 3 contain noise 202 within the femur 205 for pyramid levels 1, 2, and 3. Only the image at the lowest resolution, i.e. the image at pyramid level 4, contains no noise within the femur 205. Therefore, only pyramid level 4, which corresponds to the lowest resolution pyramid level, may be chosen at step 118 as the initial deformation level in this case.

The output of step 118 of FIG. 4 is illustratively the lowest resolution level possible that may be used to compute the contour deformation. Once this deformation level has been chosen at step 118, the gradient vector field may be computed at step 120 using various known methods, such as the Gradient method or the Gradient Vector Flow (GVF) method. When the deformation step 110 is performed for the first time (as assessed at step 121), i.e. at an initial deformation level chosen at step 118, the next step 126 may then be to deform the current contour. Alternatively, when the deformation step 110 is done at a deformation level other than the initial deformation level, contour deformation is illustratively performed starting with the contour obtained at the previous deformation level, i.e. a higher pyramid level of lower image resolution. In particular, the previous contour is projected onto the image at the current deformation level. The deformation step 110 may therefore comprise initializing the contour that will be used at the current iteration. For this purpose, after computing the gradient vector field 120 and prior to deforming the contour 126, edges, which are present inside the previous contour, may be removed at step 122 and the contour may further be moved at step 124 away from the edges.

Figure 6A:
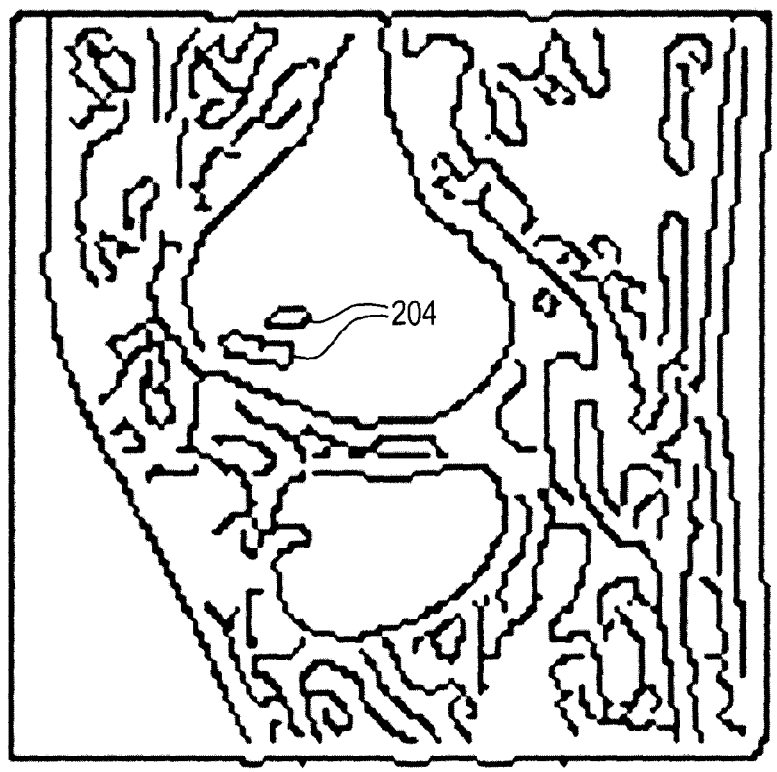
FIG. 6a and FIG. 6b illustrate removal of noisy edges in an edge image, in accordance with an illustrative embodiment of the present invention.
Figure 6B:
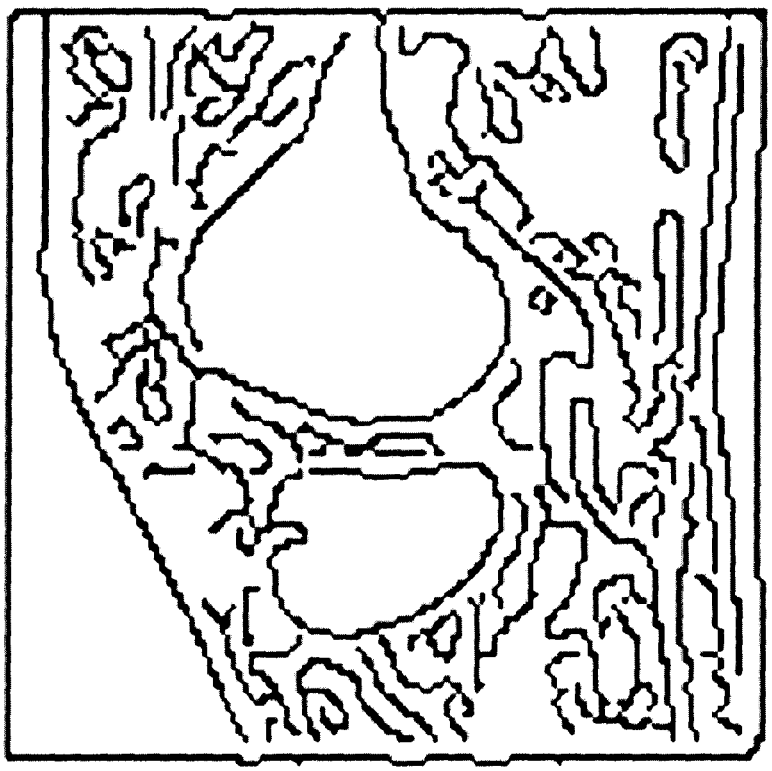

Referring to FIG. 6a and FIG. 6b in addition to FIG. 4, the step 122 of removing edges inside the previous contour may be performed to remove the noise introduced when the previous contour obtained at a first deformation level is projected onto an image at a second deformation level, which is consecutive or subsequent to, i.e. of higher resolution and therefore noisier than, the first level. In particular, by removing all edges, which are representative of noise as in 204 (see FIG. 6a), within the previous contour (not shown), it can be ensured that the contour will be deformed at step 126 in the noise-free image (see FIG. 6b) without any inaccuracies resulting from the presence of such noise 204.

Figure 7B:
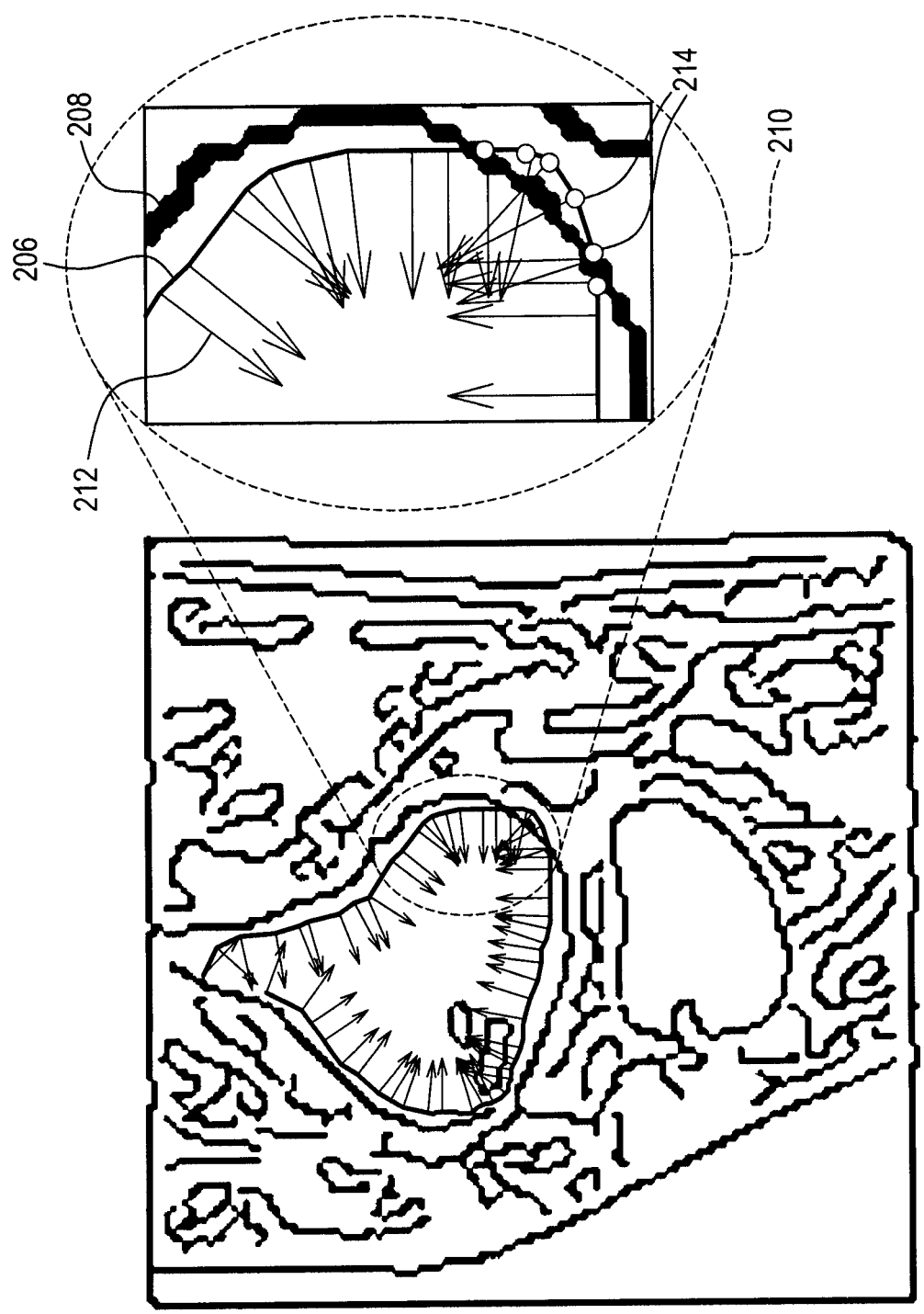

Referring to FIG. 7a and FIG. 7b in addition to FIG. 4, the step 124 of moving the contour away from the edges may be used to take into account the fact that, when projecting the previous contour 206 from an image at a first deformation level onto an image at a second (i.e. subsequent) deformation level, there may be some overlap between one or more points of the previous contour 206 and the edges 208 delimiting the area or structure to be segmented. As shown in FIG. 7a, such an overlap may occur in an area 210 of the image. Prior to deforming the contour, it may therefore be desirable to detect any overlap by sampling the contour to obtain a pixel-connected contour comprising a given number, e.g. eight (8), of neighboring pixels or points. Each pixel of the pixel-connected contour may then be checked to determine if it intersects an edge as in 208 in the image. If there is an overlap, the step 124 may comprise moving the overlapping contour points away from the edges in order to eliminate the overlap. For this purpose, the position of the intersections will be analyzed to identify which portions of the contour are to be moved to ensure the contour lies inside the edges 208. As shown in FIG. 7b, one or more of the points on the contour 206 may be moved relative to the contour normal along the direction of arrows 212. Although not illustrated, it should be understood that, rather than moving all the points on the contour 206, only the contour points as in 214, which overlap the edge 208, may be moved. In this manner, the deformation may be performed at the second deformation level starting from a contour (not shown), which does not overlap with the edges 208, thereby increasing the accuracy of the active contour deformation step 110.

As shown in FIG. 4, once the contour has been deformed at step 126, the current contour may be stored at step 128. The step 110 may further comprise assessing at step 130 whether more image levels are present in the image pyramid computed at step 108 of FIG. 1. If this is the case, i.e. the image pyramid comprises one or more levels of higher resolution than the current level, the next step 132 may be to move to the next deformation level, i.e. the image level consecutive to, i.e. having higher resolution than, the current level. Steps 120 to 130 are then repeated to deform the contour at the new deformation level. In this manner, the pyramid level and accordingly the image resolution, at which deformation is to be performed may be selected dynamically for each image. Contour deformation is then performed iteratively over multiple levels, from an initial or low image resolution to the highest image resolution. As discussed above, this is illustratively done by projecting the contour obtained at the low image resolution onto the higher resolution images. If it is determined at step 130 that there are no more image levels, i.e. the current level corresponds to the highest image resolution, this implies that the contour deformation is completed. The method 100 may then flow to the step 112 of segmenting the image.

Figure 8:
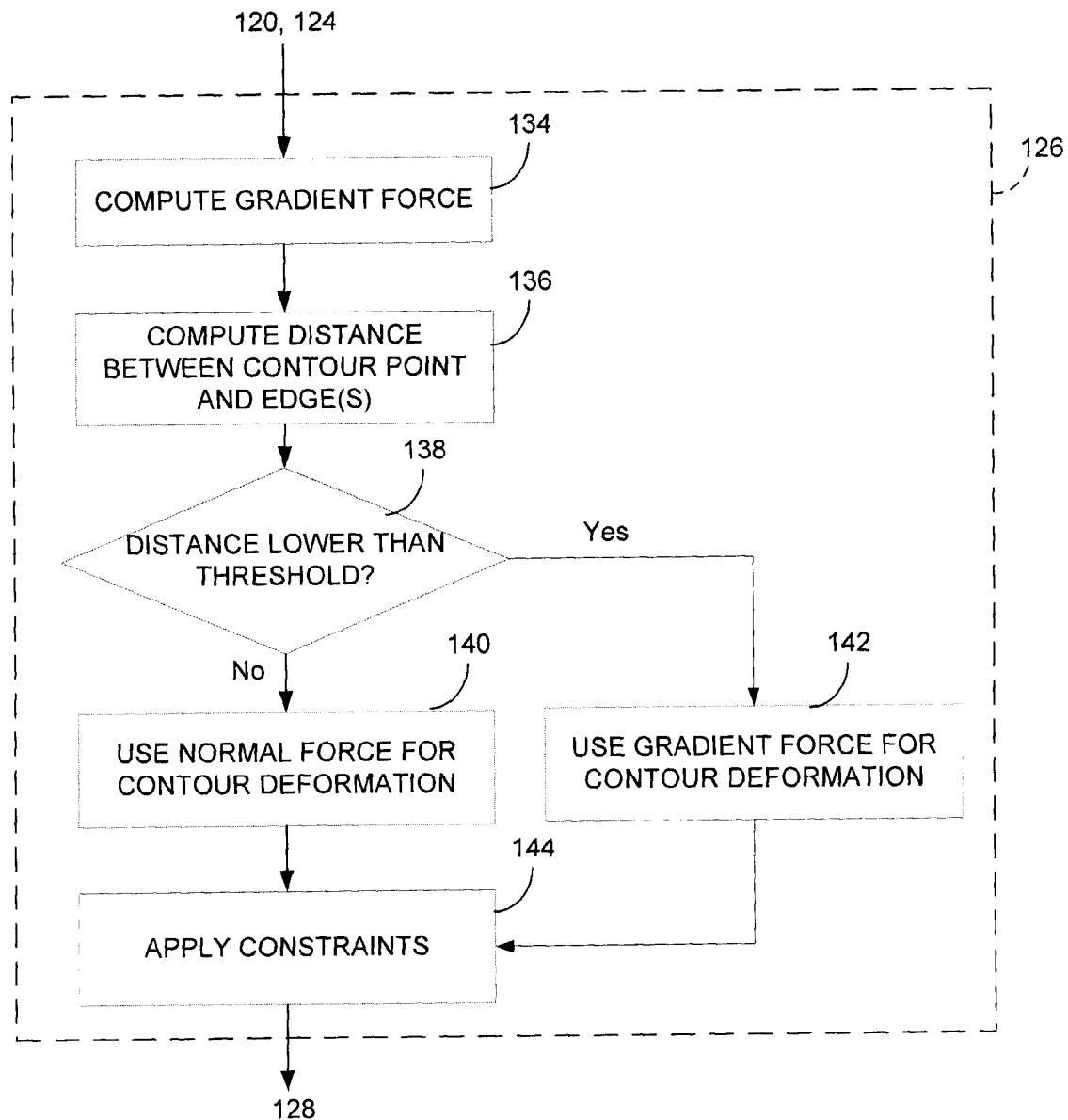
FIG. 8 is a flowchart of the step of FIG. 4 of deforming a contour.

Referring to FIG. 8, the step 126 of deforming the contour illustratively comprises computing at step 134 the gradient force of the image. This entails computing the value of the gradient for each point on the contour using techniques known to those skilled in the art. The distance between each contour point and one or more edges in the edge image may then be computed at step 136. This distance may be used to determine whether the contour is close to or far from the edges. For this purpose, the distance may be compared to a predetermined threshold distance to assess at step 138 whether the distance is lower than the threshold. If the distance is greater than the threshold, this means that the contour is far away from the edge, i.e. in an image area with low gradient values. The normal force, which represents the force that is normal to the contour at each contour point, may then be used at step 140 to deform the contour. Since the expanding contour is positioned further away from the edges in the early iterations of step 110, the normal force is illustratively used to displace the contour the most in early stages of the deformation. If the distance computed at step 136 is lower than the threshold, the contour is close to the edge, i.e. an image area with high gradient values, and the gradient force may be used at step 142 to deform the contour. In the embodiment illustrated, deformation is performed using a set of dynamically set constraints at each point along the contour.

In particular, using the normal force for contour deformation at step 140 illustratively comprises determining the displacement direction of contour points relative to the contour normal. The displacement direction of each contour point is illustratively perpendicular to the contour normal at a given contour point. Edges, which are present in the displacement direction of a current contour point, may then be identified and discrimination between edges of interest, i.e. contour edges that delineate the boundary of a structure, and noise may be performed using a priori knowledge. The a priori knowledge may be gained from the displacement of contour points adjacent to the given contour point. During deformation of the contour, all contour points illustratively evolve towards the edges in the edge image and stop once they reach an edge. The edge at which each contour point stops may either be an edge of interest, e.g. a long edge, or noise, e.g. a short and/or folded edge, as discussed above. When an edge is of interest, i.e. long, most contour points will tend to evolve towards this edge at each deformation iteration and eventually stop thereat. However, when an edge is noise, i.e. short, fewer contours points tend to evolve towards the edge and stop thereat. Using this a priori knowledge, it becomes possible to discriminate between edges and to forecast whether important edges are in the displacement direction. The evolving contour may then be prevented from stopping at false short edges, i.e. noise, thereby accurately expanding the contour within the structure to be segmented. For this purpose, the normal force may be adjusted such that the magnitude of the displacement of the contour points is sufficient to cause the contour to be displaced beyond the false edges.

Once the displacement direction has been determined and edges in the displacement direction identified, the normal force may indeed be dynamically modified. In particular, the normal force may be modified according to the distance between a point on the current contour and edges in the edge image. The normal force is indeed adjusted so that the magnitude of the displacement of the contour point is not so high that the contour, once deformed from one iteration to the next, is displaced beyond a given edge, e.g. an edge of interest. For this purpose, the normal force may, for example, be dynamically modified so as not to apply to all contour points and/or have a maximum magnitude for all deformation iterations.

The normal force may also be adjusted to avoid having the expanding contour enter into holes between edges. This may be done by setting a threshold parameter for a distance between two edges. If the distance between the edges is smaller than the threshold parameter, the contour is not allowed to enter the space between the edges during its deformation at that point. During the deformation process, the magnitude of the vector field at each point along a contour may be evaluated. For zones where the magnitude is lower than a given parameter, spacing or distance between edges is measured and the normal force applied at those points may be reduced in order to avoid having the contour enter a small hole between the edges. Alternatively, holes may be detected according to the distance between each contour point and the edges, as computed at step 136. In particular, holes may be detected by identifying adjacent points on the current contour, which are close to edges present in the displacement direction. For instance, for a contour comprising fifty (50) points numbered from 1 to 50, contour points 10 to 20 may be identified as being close to a first edge and points 24 to 30 as being close to a second edge while contour points 21 to 23 are close to neither the first nor the second edge. As such, it can be determined that points 21 to 23 are positioned nearby a hole of size two (2) units between the first edge and the second edge. Having detected this hole, the current contour can be prevented from entering therein by adjusting the normal force applied to contour points 21 to 23 accordingly. In addition, once a hole is detected, its size may be compared to a predetermined threshold size. In this embodiment, the normal force may not be used to prevent the contour from entering holes that are under the threshold size.

One or more constraints may further be applied at step 144 to ensure the contour is deformed as desired. Such constraints may comprise one or more form constraints each used to impose certain constraints to pixels locally as a function of expected shapes being defined and of the position of a given pixel within the expected shape. For example, if the structure being defined is the cartilage of a femur bone, a point along a contour defining the cartilage of the bottom end of the femur may then be treated differently than a point along a contour defining the cartilage of the top end of the femur. Since the top end of the femur is much larger than the bottom end of the femur, the restrictions applied to the point on the bottom end contour differ from the restrictions applied to the point on the top end contour. For example, if the structure to be segmented has the form of a vertical cylinder, as is the case of the cartilage at the top end of the femur, the form constraint may be used to reduce the displacement of the contour in the horizontal, i.e. X, direction and to force the contour to move in the vertical, i.e. Y, direction only. The form constraint may further specify that no more than 50% of the displacement of contour points is to be performed in the X direction than in the Y direction. The form constraint may therefore modify the displacement vector of the contour so as to increase or decrease the contour's displacement strength in a given direction. In order to apply form constraints, various form constraint zones may be defined and contour points present in the form constraint zones identified. This allows the form constraints to be applied as a function of the position of the pixel and the form constraint zone in which it sits. Application of the form constraints may comprise applying variable forces on X and Y components of a displacement vector as a function of position in the structure.

It should be understood that other constraints may apply. It should also be understood that the form constraint(s) may be applied only for certain deformation iterations, certain shapes, or for pixels in certain positions of certain shapes. This may accelerate the process as the form constraints may, for instance, be less relevant, or have less of an impact, when the contour being deformed is still very small. Also, the selection of which constraints to apply may be set manually by an operator, or may be predetermined and triggered using criteria.

Figure 9:
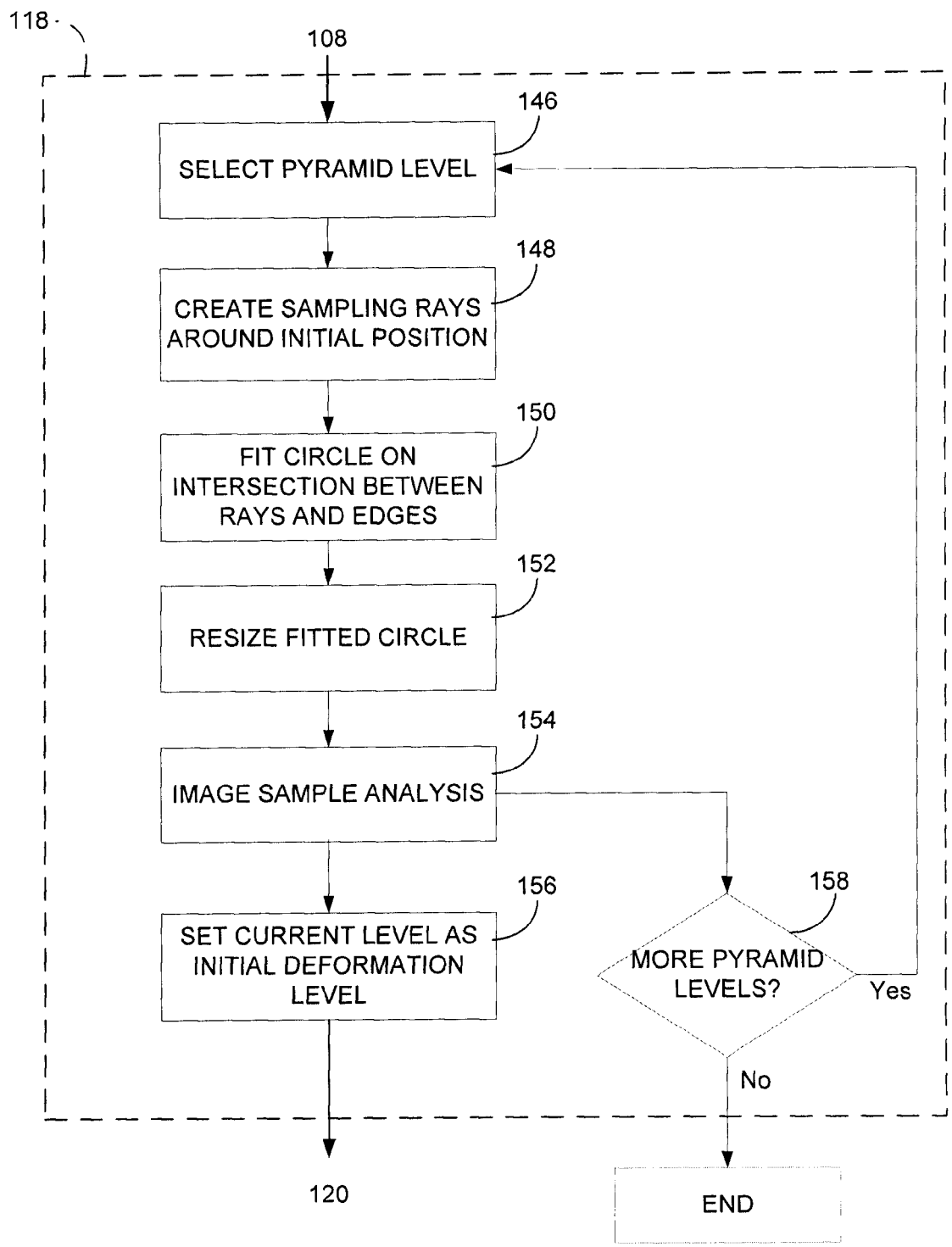
FIG. 9 is a flowchart of the step of FIG. 4 of choosing an initial deformation level.
Figure 10A:
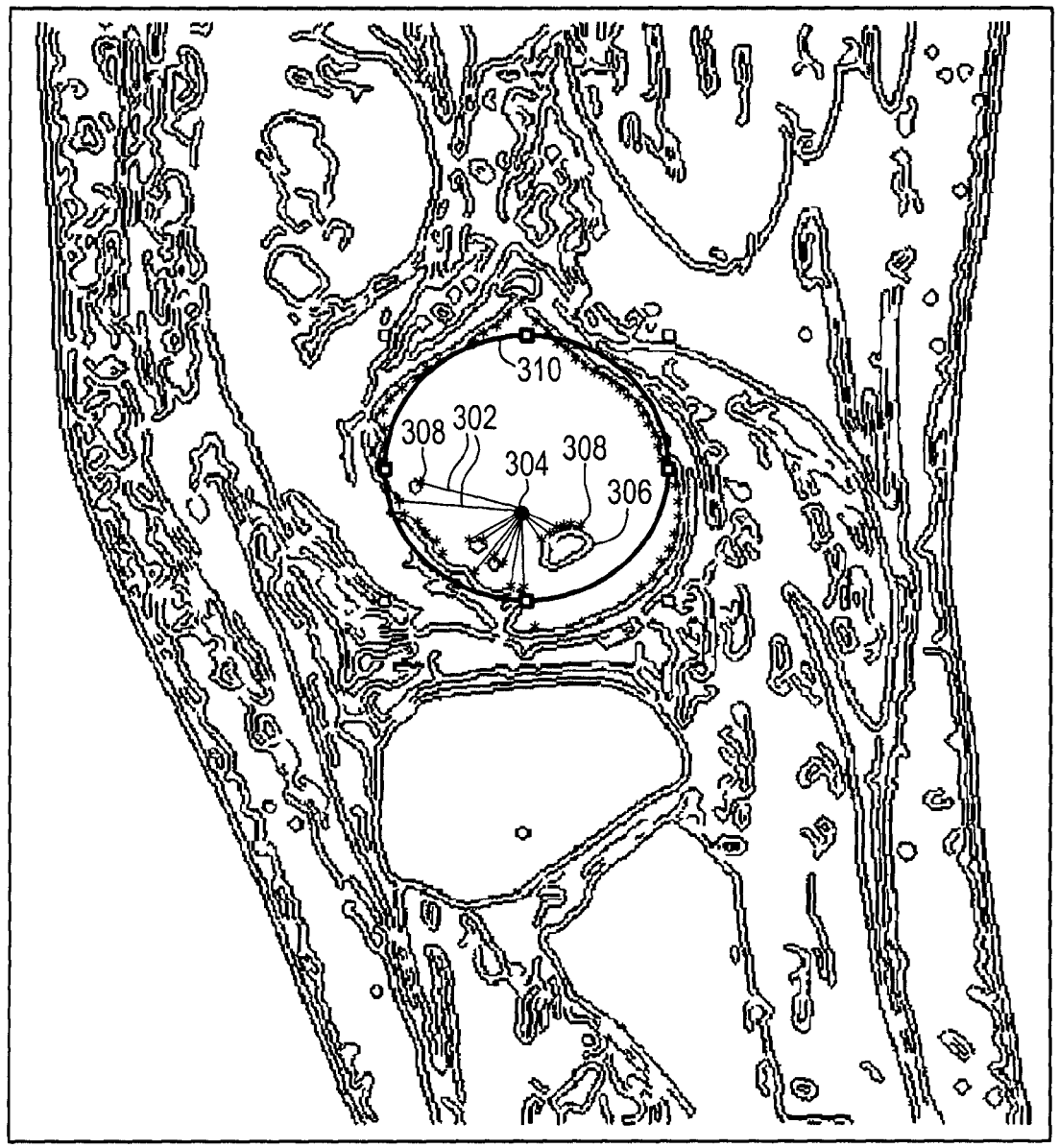
FIG. 10a illustrates a sample circle fitted around intersection points in an edge image, in accordance with an illustrative embodiment of the present invention.

Referring now to FIG. 9, the step 118 of choosing an initial deformation level illustratively comprises selecting a pyramid level at step 146 among the levels of the image pyramid computed at step 108 of FIG. 1. The level selected at step 146 is illustratively the level with the highest image resolution. Once the pyramid level has been selected at step 146, the step 118 may then determine, starting from the initial position received at step 104 of FIG. 1, whether edges adjacent the initial position correspond to edges of interest or to noise in the image. For this purpose, the step 118 may comprise creating at step 148 sampling rays around the initial position. As shown in FIG. 10a, such sampling rays as in 302 may extend radially away from the initial position 304. The sampling rays 302 may intersect edges as in 306, which are present in the image, at intersection points 308. The step 148 may then comprise retaining in the image the intersection points 308, which are closest to the initial position 304 (e.g. within a threshold distance thereof), while removing others. The next step 150 may then be to fit a sample circle (reference 310 in FIG. 10a) on the intersection between the sampling rays 302 and the edges 306. The circle 310 may be set so as to minimize the distance between a perimeter of the circle 310 and the intersection points 308. The circle 310 may be obtained using least-square methods or the like.

Figure 10B:
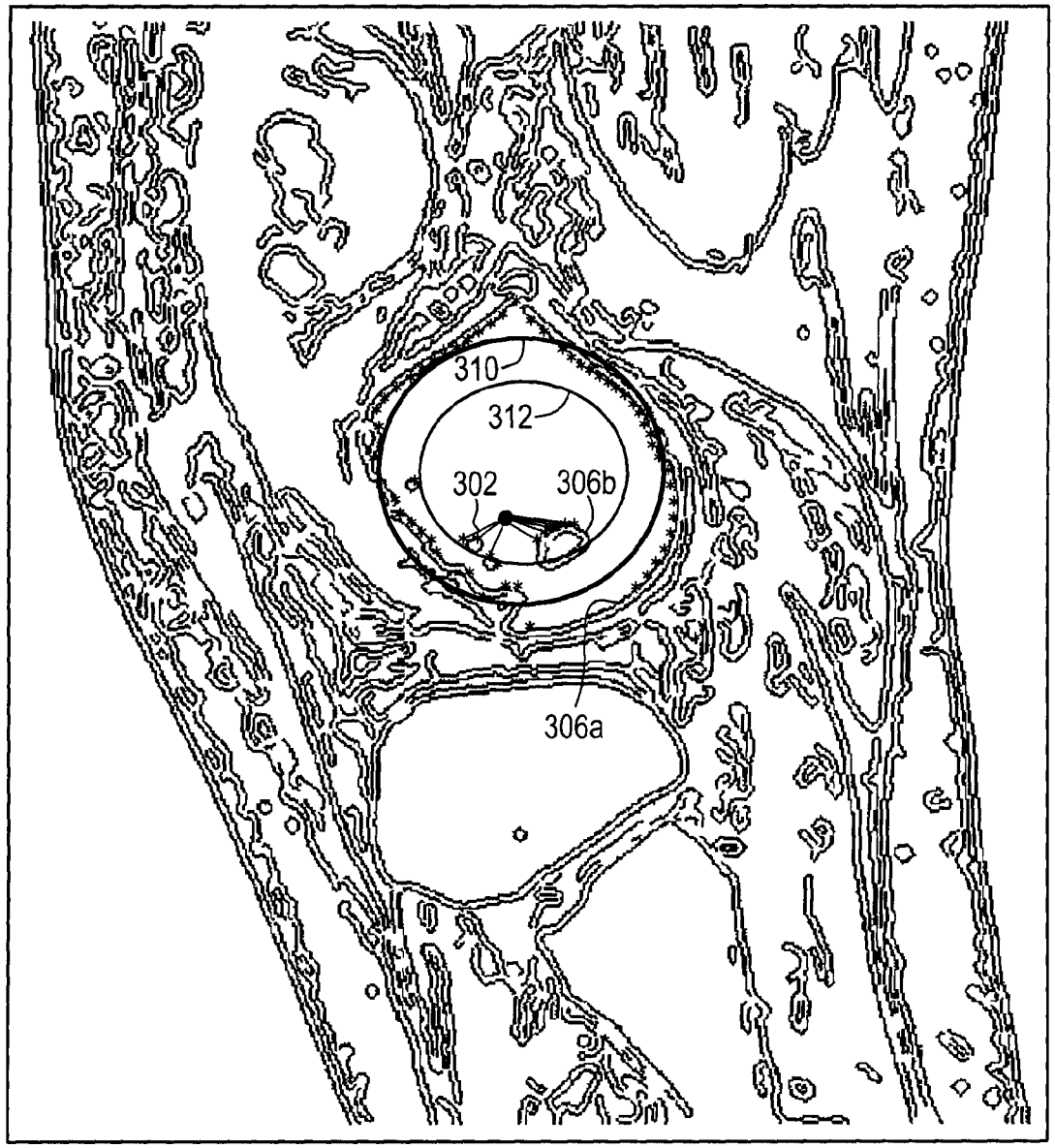
FIG. 10b illustrates the sample circle of FIG. 10a being resized, in accordance with an illustrative embodiment of the present invention.

Referring now to FIG. 10b in addition to FIG. 9 and FIG. 10a, the fitted sample circle 310 may be resized at step 152 into a circle 312 in order to only retain inside the new circle 312 intersection points 308 of interest. Such points of interest may comprise intersection points 308 that lie on noisy edges, as in 306b. As such, step 152 may first comprise removing intersection points 308 that lie on edges of interest as in 306a, i.e. contour edges that delineate the boundary of the structure to be segmented. Intersection points 308 that lie on noisy edges, as in 306b, may then be kept in the image. The size, e.g. diameter, of the circle 310 may further be decreased so that the area delineated by the new circle 312 covers the intersection points 308 that lie on the noisy edges 306b. In this manner, any edges as in 306b, which are present inside the circle 312, can be considered as being generated by noise. The region within the circle 312 may then serve as a region of interest in which noisy edges as in 306b can be detected. In particular, the presence of such edges 306b may then indicate that a lower image resolution, i.e. with less noise, is to be used to deform the contour.

Image sample analysis may be used at step 154 of FIG. 9 to determine whether noise is present within the resized circle 312 and therefore identify a resolution or pyramid level adequate for deformation, as will be discussed further below. Once it is determined that the current level is adequate, the current level may be set as the initial deformation level at step 156. Otherwise, the next step 158 may be to assess whether more pyramid levels are present in the pyramid image. If this is the case, the method 100 may flow back to the step 146 of selecting a pyramid level. In this case, the pyramid level selected at step 146 is illustratively the level of lower resolution than the previous level. If it is determined at step 158 that there are no more pyramid levels, this implies that no pyramid level is suitable to perform contour deformation and the method 100 may end.

Figure 11:
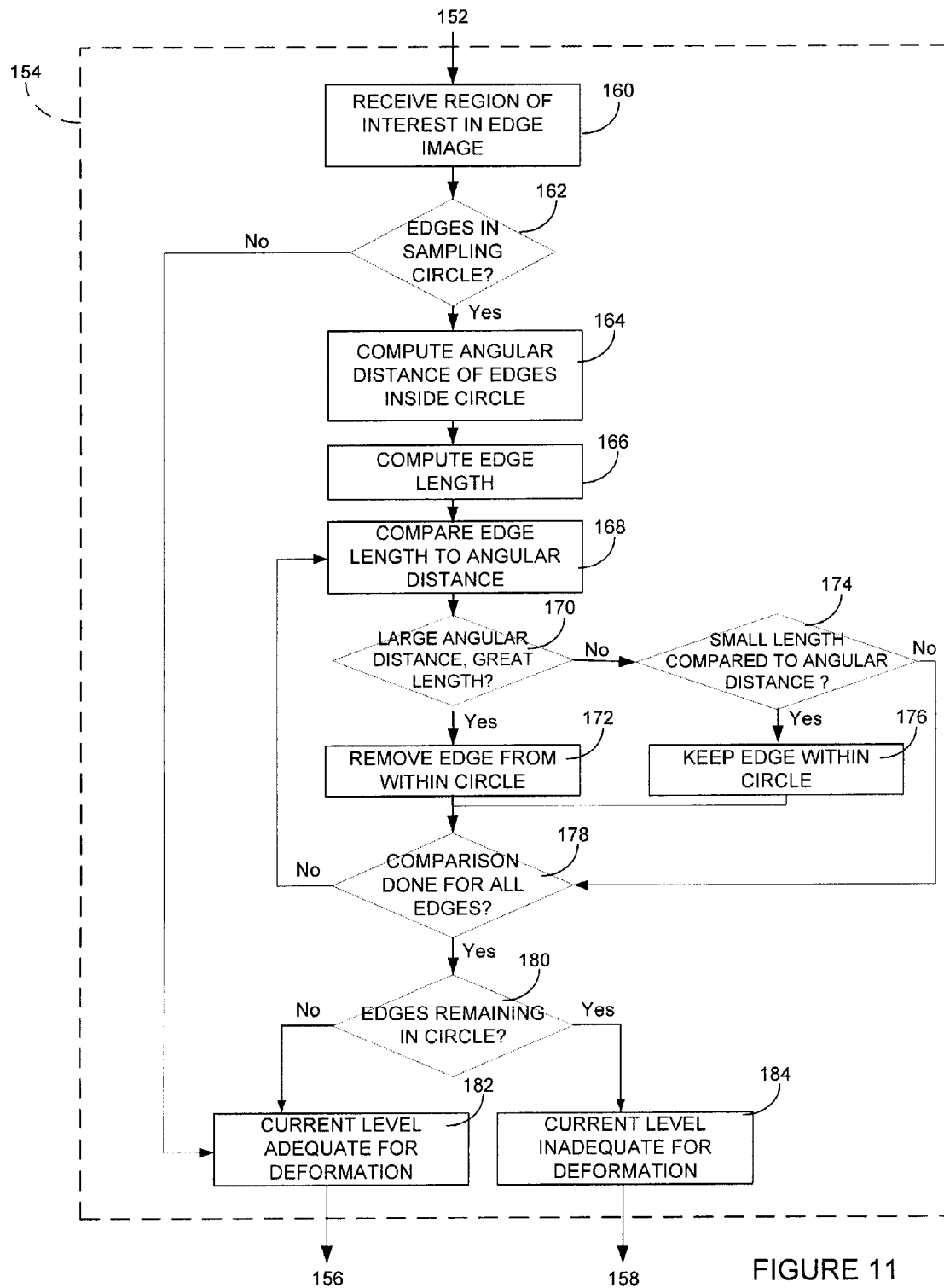
FIG. 11 is a flowchart of the step of FIG. 9 of image sample analysis.

As shown in FIG. 11, the step 154 of image sample analysis illustratively comprises receiving at step 160 the region of interest as defined at step 152 in the edge image by the resized sampling circle (reference 312 in FIG. 10b). The next step 162 may then be to determine whether edges are present inside the sampling circle, i.e. within the region of interest. If this is the case, the angular distance of edges present inside the sampling circle may be computed at step 164. The length of such edges may also be computed at step 166. For each edge inside the sampling circle, the edge length may then be compared at step 168 to the angular distance in order to discriminate between edges of interest and noise. For this purpose, a ratio between the edge length and the angular distance may be computed for each edge. This enables to discriminate between edges taking into account both the length and the amount of curvature change of the edges.

Figure 12:
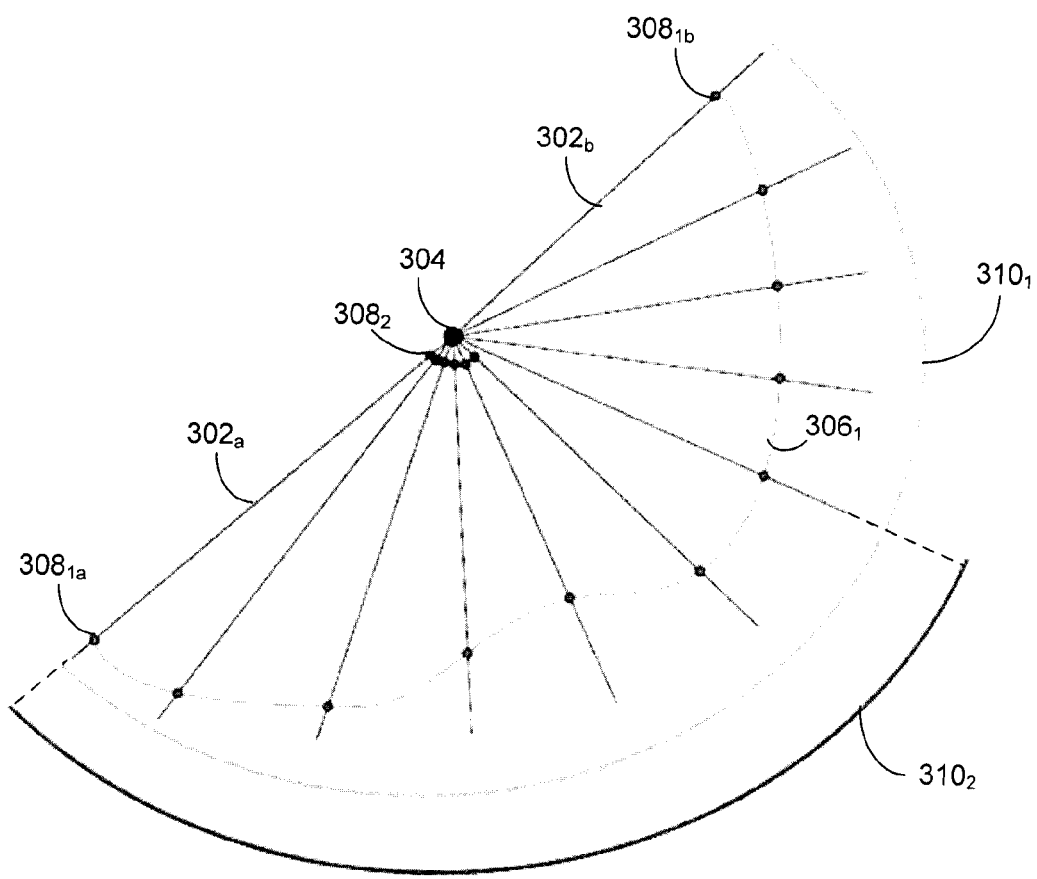
FIG. 12 illustrates a comparison between the length and the angular distance of a first and a second edge, in accordance with an illustrative embodiment of the present invention.

In particular, as illustrated in FIG. 12, a first edge $306_1$ may comprise a first intersection point $308_1$, with a first sampling ray $302_a$ extending from the initial point 304, a last intersection point $308_{1b}$ with a last sampling ray $302_b$. In between points $308_{1a}$ and $308_{1b}$, the first edge $306_1$ may comprise a plurality of intersection points (not shown) with additional sampling rays (not shown) extending from the initial point 304. A second edge (not shown) may further comprise a plurality of intersection points $308_2$ with the sampling rays $302a, \ldots, 302b$. The length of each edge may be computed between the first one of the edge's intersection points, e.g. intersection point $308_{1a}$, and the last one of the edge's intersection points, e.g. point $308_{1b}$. It can be seen that, because the first edge $306_1$ is further away from the initial point 304 than the second edge, the first edge $306_1$ has a greater length than the second edge. In addition, the intersection points $308_{1a}, \ldots, 308_{1b}$ of the first edge $306_1$ cover a greater proportion of the radial sampling of the rays $302a, \ldots, 302b$ than the intersection points $308_2$ of the second edge. As such, the angular distance $310_1$ of the first edge $306_1$ is greater than the angular distance $310_2$ of the second edge. As discussed above, edges of interest typically have a large angular distance and a great length while noisy edges have a small length compared to their angular distance. It can therefore be determined that the second edge is a noisy edge while the first edge $306_1$ is an edge of interest.

Thus, referring back to FIG. 11, following step 168, step 170 may comprise assessing whether the edge in question has a large angular distance and a great length. This may be done by comparing the computed ratio of the length to the angular distance to a threshold ratio. If the edge has a large angular distance and a great length, e.g. the computed ratio is above the threshold ratio, this implies that the edge is a contour edge and it may be removed from within the sampling circle at step 172. Otherwise, the next step 174 may be to assess whether the edge in question has a small length compared to its angular distance, e.g. if the computed ratio of the length to the angular distance is below the threshold ratio. If this is the case, this implies that the edge is noisy and it is kept at step 176 within the circle. Step 178 of determining whether the comparison has been done for all edges may then follow steps 172 and 176. If the angular distance is neither large with the edge being long nor is the length small compared to the angular distance of the edge, the method 100 may also flow to step 178.

If it is determined at step 178 that the comparison is not done for all edges, the method 100 may flow back the step 168 of comparing for the remaining edge(s) the edge length to the angular distance. Otherwise, the next step 180 may be to determine whether edges remain in the sampling circle. If no edges remain, this implies that there are no more noisy edges within the region of interest and it can be concluded at step 182 that the current resolution level is adequate for deformation. The same conclusion can be reached if it was determined at step 162 that no edges were present in the sampling circle to begin with. Otherwise, if noisy edges remain inside the sampling circle, it can be concluded at step 184 that the current resolution level is inadequate for deformation and that a lower resolution level should be chosen.

The method may in this case flow back to the step 158 (see FIG. 9) of determining whether additional pyramid levels are present in the image.

Figure 13:
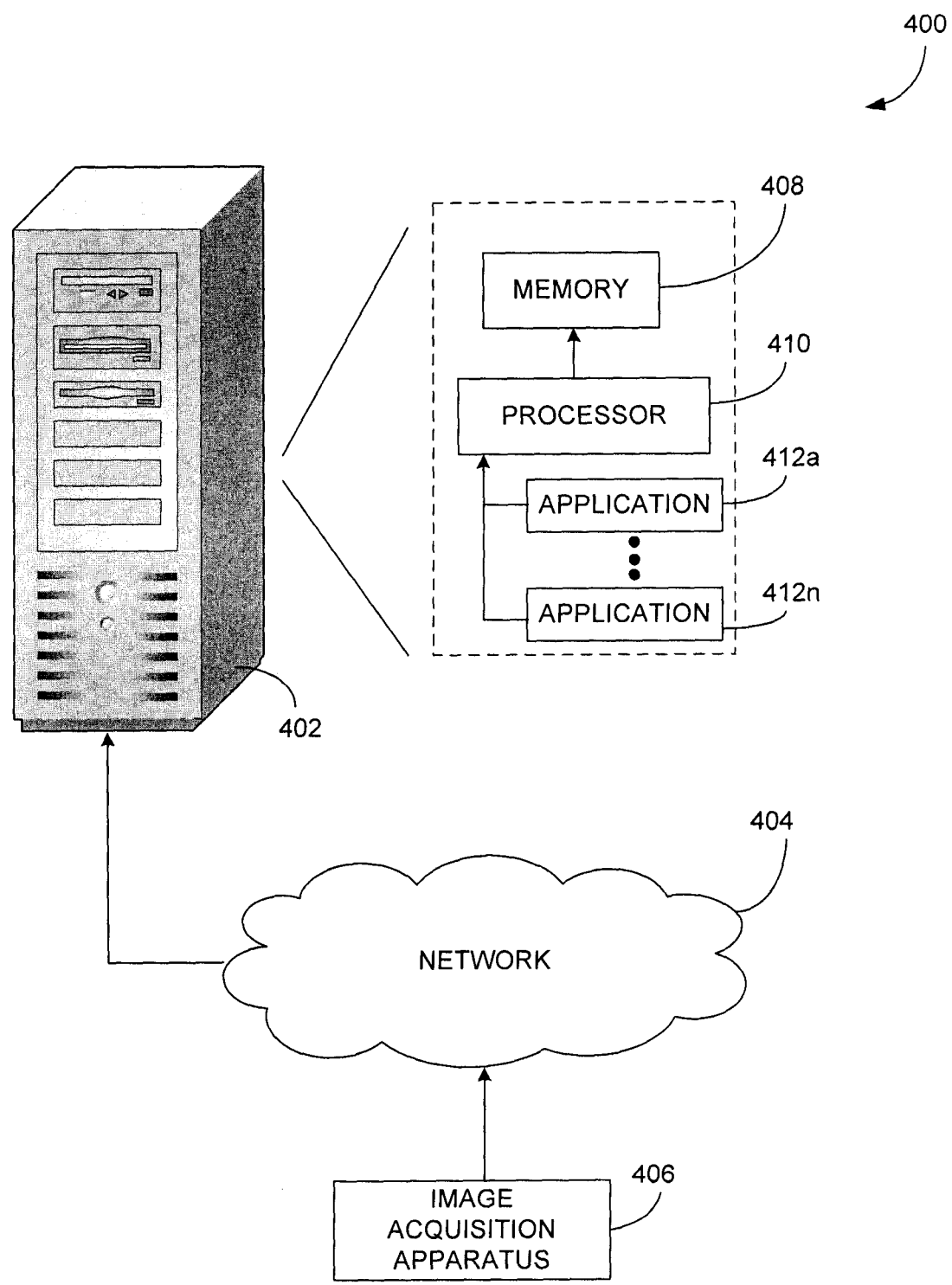
FIG. 13 is a block diagram of an exemplary system for performing multi-scale active contour segmentation, in accordance with an illustrative embodiment of the present invention.

Referring now to FIG. 13, a system 400 for performing multi-scale active contour segmentation will now be described. One or more server(s) 402 are provided remotely and accessible via a network 404. The server 402 is adapted to receive imaging data form an image acquisition apparatus 406, such as an MRI apparatus, or the like, or from another computing device (not shown). The apparatus 406 is connected to the server 402, via any type of network as in 404, such as the Internet, a cellular network, or others known to those skilled in the art.

The server 402 comprises, amongst other things, a memory 408 having coupled thereto a processor 410 on which are running a plurality of applications $412a \ldots 412n$. It should be understood that while the applications $412a \ldots 412n$ presented herein are illustrated and described as separate entities, they may be combined or separated in a variety of ways. The processor 410 is illustratively represented as a single processor but may correspond to a multi-core processor or a plurality of processors operating in parallel.

One or more databases (not shown) may be integrated directly into memory 408 or may be provided separately therefrom and remotely from the server 402. In the case of a remote access to the databases, access may occur via any type of network 404, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "443" is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 408 accessible by the processor 410 receives and stores data. The memory 408 may be a main memory, such as a high speed Random Access Memory (RAM), or an auxiliary storage unit, such as a hard disk or flash memory. The memory 408 may be any other type of memory, such as a Read-Only Memory (ROM), Erasable Programmable Read-Only Memory (EPROM), or optical storage media such as a videodisc and a compact disc.

The processor 410 may access the memory 408 to retrieve data. The processor 410 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 412a . . . 412n are coupled to the processor 408 and configured to perform various tasks as explained below in more detail. An output may be transmitted to an output device (not shown) or to another computing device via the network 404.

Figure 14A:
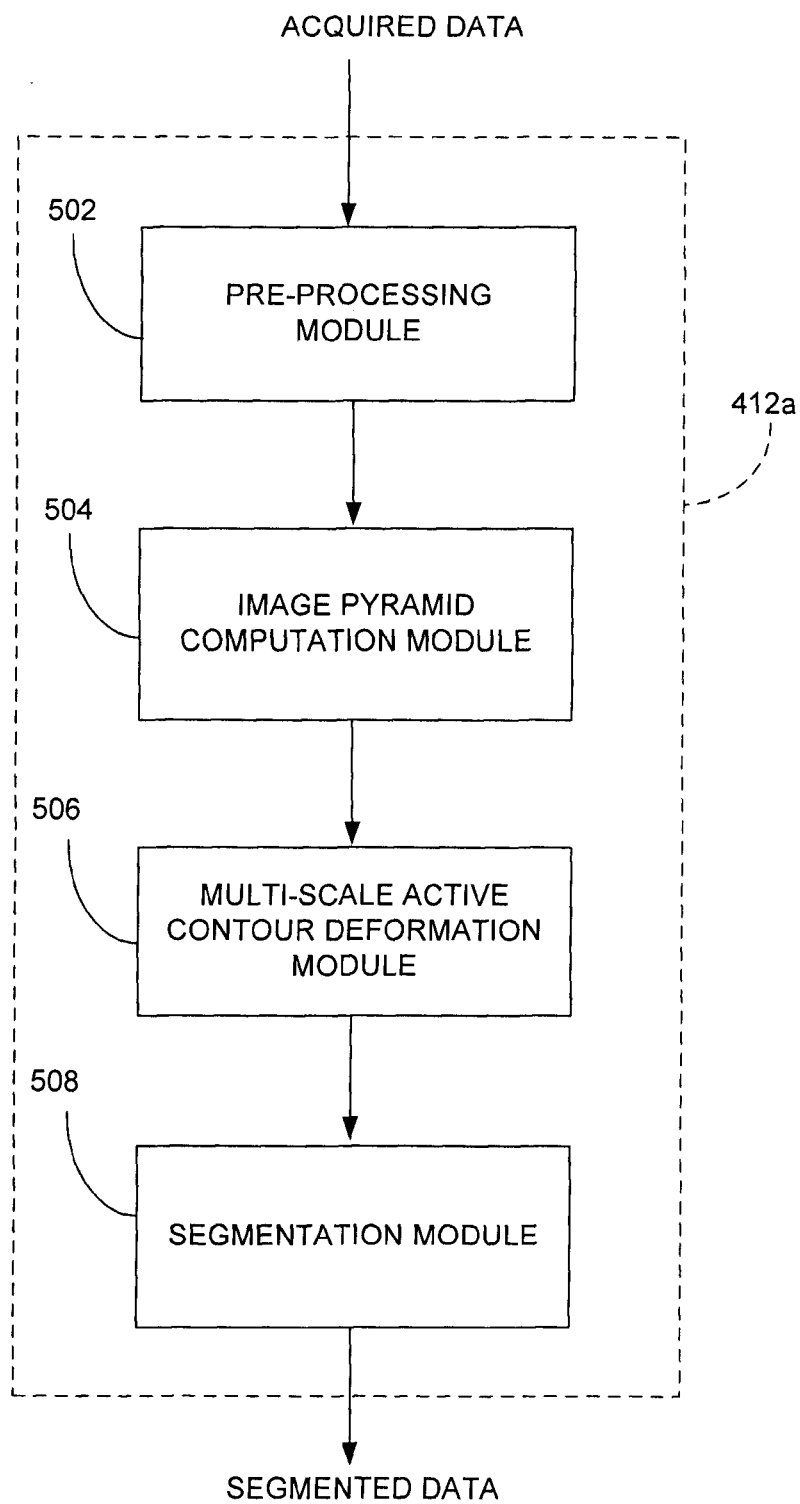
FIG. 14a is a block diagram showing an exemplary application running on the processor of FIG. 13, for performing multi-scale active contour segmentation.

FIG. 14a illustrates an exemplary application 412a running on the processor 410. The application 412a comprises at least a pre-processing module 508, an image pyramid computation module 504, a multi-scale active contour deformation module 506, and a segmentation module 508. These modules 502, 504, 506, 508 interact together in order to provide segmented data from imaging data acquired by the image acquisition apparatus (reference 406 in FIG. 13). The acquired data is illustratively received at the pre-processing module 502 and processed in accordance with the flowcharts of FIG. 1, FIG. 2, FIG. 4, FIG. 8, FIG. 9, and FIG. 11 in order to generate segmented data. In particular, the pre-processing module 502 may process the acquired data by performing the anisotropic filtering and edge detection steps discussed above with respect to FIG. 2. The output of the pre-processing module 502 is illustratively edge image data, which is fed to the image pyramid computation module 504. From the edge image data, the image pyramid computation module 504 may then compute an image pyramid, as discussed above with reference to FIG. 3. The data output by the image pyramid computation module 504 is then fed to the multi-scale active contour deformation module 506 and to the segmentation module 508, which then outputs the segmented data.

Figure 14B:
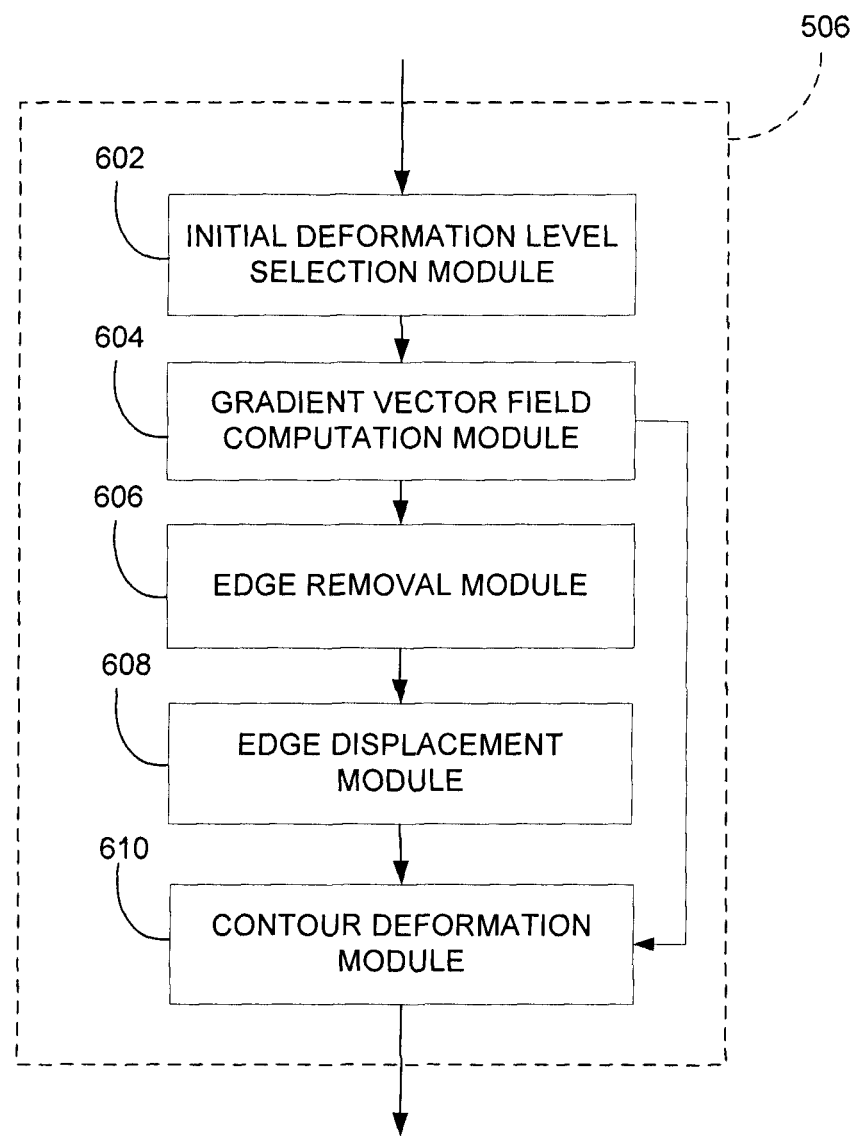

FIG. 14b illustrates an exemplary embodiment of the multi-scale active contour segmentation module 506, which may comprise an initial deformation level selection module 602, a gradient vector field computation module 604, an edge removal module 606, an edge displacement module 608, and a contour deformation module 610. The initial deformation level selection module 602 may be used to determine the initial pyramid level at which contour deformation is to be performed. The initial deformation level selection module 602 thus illustratively outputs the lowest resolution level possible at which noise is substantially removed to be used for contour deformation. Once this initial deformation level has been determined, the gradient vector field computation module 604 may then compute the gradient vector field in the edge image. If deformation is performed for the first time, i.e. at the initial deformation level, the contour deformation module 610 may then be used to deform the contour. Otherwise, if a previous contour is being projected at the current pyramid level, the edge removal module 606 may be used to remove edges found in the previous contour. The edge displacement module 608 may also be used to move the contour away from the edges if there is an overlap between the contour and the edges. Various embodiments for implementing the steps of FIG. 4 using the contour deformation module 610 will be readily understood by those skilled in the art.

Figure 14C:
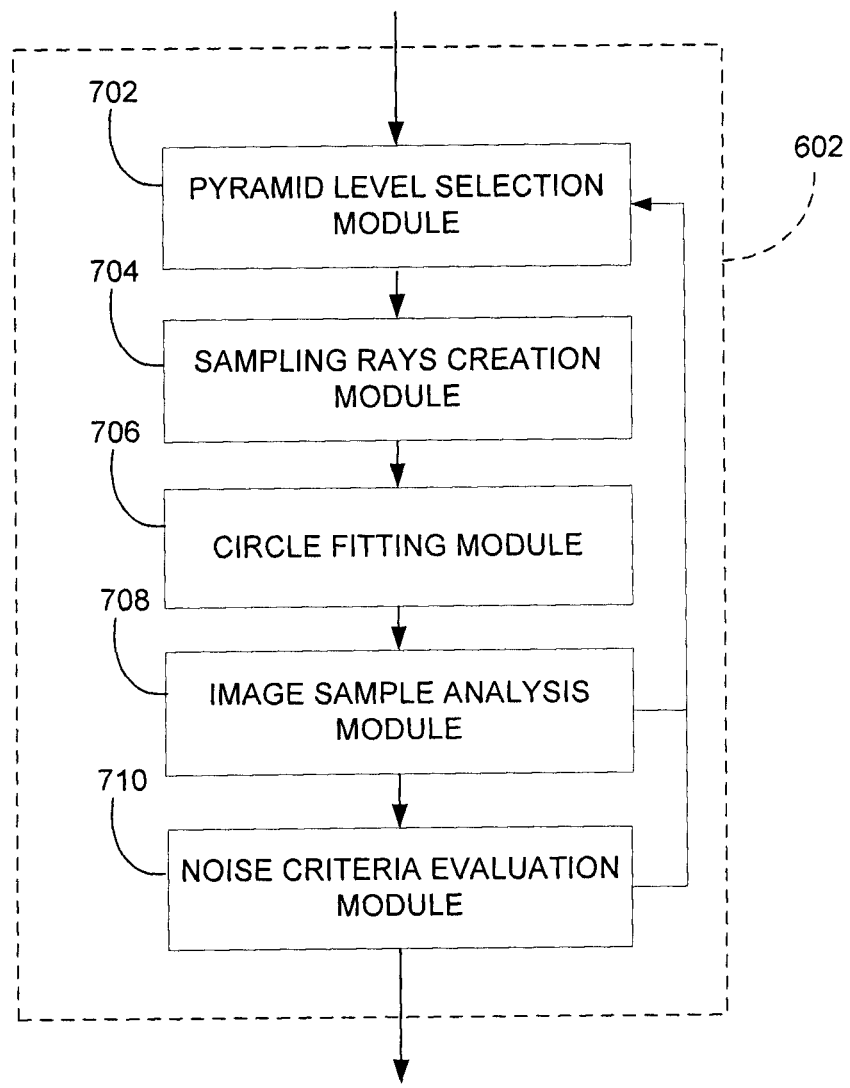
FIG. 14c is a block diagram showing an exemplary initial deformation level selection module of FIG. 14b.

Referring to FIG. 14c, the initial deformation level selection module 602 illustratively comprises a pyramid level selection module 702, sampling rays creation module 704, a circle fitting module 706, an image sample analysis module 708, and a noise criteria evaluation module 710. The pyramid level selection module 702 may be used to choose a pyramid level. The sampling rays creation module 704 may then create sampling rays around the initial point from which contour deformation is to be initiated. The circle fitting module 706 may create and fit a circle on the intersection between the sampling rays and edges in the image of the structure to be segmented. The circle fitting module 706 may also be used to resize the original sample circle, as discussed above. The image sample analysis module 708 may then be used to analyze the area delineated by the fitted circle in order to detect the presence of noisy edges. Once this analysis is done, the image sample analysis module 708 may output an indication of whether the current pyramid level is adequate to perform contour deformation or whether a lower level is to be used. If the level is inadequate to perform contour deformation, the image sample analysis module 708 may communicate with the pyramid level selection module 702 so a new pyramid level is selected. Otherwise, the noise criteria evaluation module 710 may be used to assess whether the current level reaches noise level criteria. If this is not the case, the noise criteria evaluation module 710 may communicate with the pyramid level selection module 702 so a new pyramid level is selected.

Figure 14D:
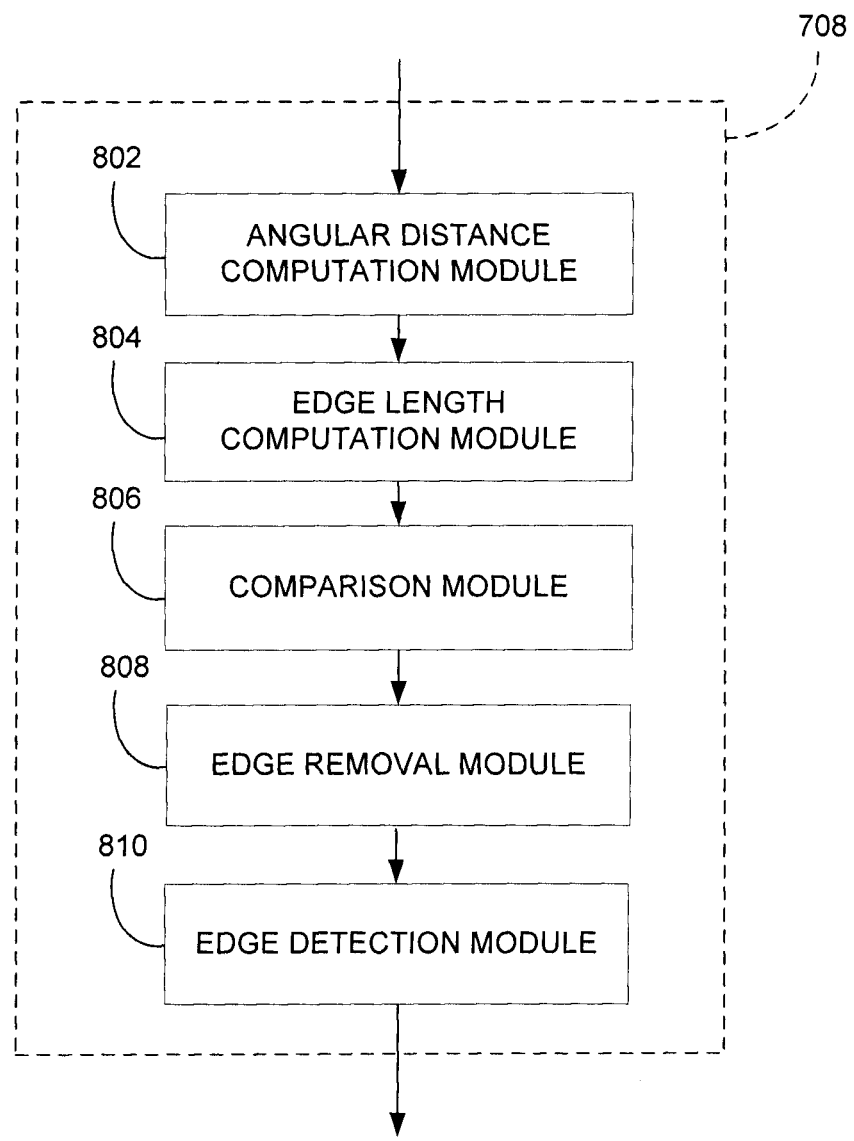
FIG. 14d is a block showing an exemplary image sample analysis module of FIG. 14c.

Referring to FIG. 14d, the image sample analysis module 708 illustratively comprises an angular distance computation module 802 for computing the angular distance of each edge present in the sampling circle and an edge length computation module 804 for computing the length of such edges. A comparison module 806 may then compare the angular distance to the edge length to discriminate between contour and noisy edges, as discussed above. An edge removal module 808 may then remove contour edges identified by the comparison module 806. An edge detection module 810 may further detect whether edges remain in the sampling circle after the edge removal module 808 has removed the contour edges. If edges remain, the edge detection module 810 can conclude that a lower resolution should be used. Otherwise, the edge detection module 810 can conclude that the current level is adequate to compute deformation.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A computer-implemented method for active contour segmentation of imaging data, the method comprising:

(a) receiving at least one image for a given structure and obtaining an initial position on the image;

for each one of the at least one image,
(b) computing a multi-scale image representation comprising a plurality of successive image levels each having associated therewith a representation of the image, a representation of the image at a given one of the plurality of successive image levels having a different image resolution than that of a representation of the image at a subsequent one of the plurality of successive image levels;
(c) identifying a given one of the image levels at which noise in the image is removed;
(d) setting the initial position as a current contour and the given image level as a current image level;
(e) deforming the current contour at the current image level to expand into an expanded contour matching a shape of the given structure;
(f) setting the expanded contour as the current contour and the subsequent one of the plurality of image levels as the current image level; and
(g) repeating steps (e) and (f) until a last one of the plurality of image levels is reached,
wherein identifying the given one of the image levels comprises:
(h) identifying a selected representation of the image associated with a selected one of the plurality of image levels and at which the image resolution is highest;
(i) defining a region of interest within the selected representation of the image;
(j) performing image sample analysis to determine whether noise is present within the region of interest;
(k) if no noise is present within the region of interest, determining that the selected image level is adequate for initiating contour deformation thereat and setting the selected image level as the given one of the image levels; and
(l) otherwise, selecting another one of the plurality of image levels having a lower image resolution than that of the selected image level, setting the other one of the plurality of image levels as the selected image level, and repeating steps (i) to (l) until the last one of the plurality of image levels is reached.

2. The method of claim 1, wherein defining the region of interest within the selected representation of the image comprises:
extending a plurality of sampling rays radially away from the initial position;
identifying intersection points between the plurality of sampling rays and edges present in the selected representation of the image;
computing a distance between each one of the intersection points and the initial position and comparing the distance to a first threshold;
removing from the selected representation of the image ones of the intersection points whose distance is beyond the first threshold and retaining other ones of the intersection points;
fitting a sampling circle on retained ones of the intersection points;
discriminating between ones of the edges representative of noise in the selected representation of the image and ones of the edges delimiting a boundary of the given structure in the selected representation of the image;
removing ones of the intersection points that lie on the edges delimiting the boundary of the given structure; and
resizing the sampling circle for only retaining therein the intersection points that lie on the edges representative of noise, the region of interest defined as an area within the resized sampling circle.

3. The method of claim 2, wherein performing image sample analysis comprises:
assessing whether one or more of the edges are present inside the resized sampling circle;
if no edges are present inside the resized sampling circle, determining that no noise is present within the region of interest;
otherwise, if one or more of the edges are present inside the resized sampling circle,
for each one of the one or more edges present, computing an angular distance of the edge, computing a length of the edge, computing a ratio of the length to the angular distance, comparing the computed ratio to a threshold ratio, retaining the edge within the resized sampling circle if the computed ratio is below the threshold ratio, and otherwise removing the edge from within the resized sampling circle,
assessing whether edges remain inside the resized sampling circle,
if edges remain inside the resized sampling circle, determining that noise is present within the region of interest, and
otherwise, determining that no noise is present within the region of interest.

4. The method of claim 1, further comprising, after setting the expanded contour as the current contour and the subsequent one of the plurality of image levels as the current image level and prior to the deforming, projecting the expanded contour set as the current contour onto the representation of the image associated with the subsequent image level set as the current image level, the deforming comprising deforming the projected expanded contour in the representation of the image associated with the subsequent image level set as the current image level.

5. The method of claim 4, further comprising, after setting the expanded contour as the current contour and the subsequent one of the plurality of image levels as the current image level and prior to the deforming, identifying one or more noisy edges present inside the current contour, the one or more noisy edges representative of noise introduced in the image as a result of the projecting; and removing the one or more noisy edges.

6. The method of claim 5, further comprising, after setting the expanded contour as the current contour and the subsequent one of the plurality of image levels as the current image level and prior to the deforming:
identifying one or more boundary edges delimiting a boundary of the given structure in the image;
sampling the current contour to obtain a pixel-connected contour comprising a plurality of neighboring points;
determining, for each one of the plurality of neighboring points, whether the neighboring point overlaps any one of the one or more boundary edges; and
if the point overlaps, moving the point away from the one or more boundary edges along a direction of a normal to the current contour, thereby eliminating the overlap.

7. The method of claim 1, wherein deforming the current contour at the current image level comprises:
computing a value of a gradient force at each point on the current contour;
computing a distance between each point on the current contour and one or more edges present in the image;
comparing the distance to a third threshold;
if the distance is lower than the third threshold, using the gradient force to displace the current contour; and otherwise, using a force normal to the current contour at each point along the current contour to displace the current contour.

8. The method of claim 7, wherein using the normal force to displace the current contour comprises:
determining a displacement direction of each point along the current contour;
for each point along the current contour, identifying ones of the one or more edges present in the displacement direction;
discriminating between ones of the one or more edges present in the displacement direction that delineate a boundary of the given structure and ones of the one or more edges present in the displacement direction and representative of noise in the image; and
adjusting the normal force in accordance with the distance between each point along the current contour and the one or more edges present in the displacement direction such that a displacement magnitude of the point in the displacement direction causes the current contour to be displaced beyond the one or more edges present in the displacement direction and representative of noise.

9. The method of claim 8, further comprising computing a spacing between the one or more edges present in the displacement direction, comparing the spacing to a tolerance, and, if the spacing is below the tolerance, adjusting the normal force such that the displacement magnitude of the point in the displacement direction prevents the current contour from entering the spacing between the one or more edges.

10. The method of claim 1, wherein obtaining the initial position comprises one of randomly determining a point inside a boundary of the given structure in the image and receiving a user-defined selection of the initial position.

11. A system for active contour segmentation of imaging data, the system comprising:
a memory;
a processor; and
at least one application stored in the memory and executable by the processor for:
(a) receiving at least one image for a given structure and obtaining an initial position on the image;
for each one of the at least one image,
(b) computing a multi-scale image representation comprising a plurality of successive image levels each having associated therewith a representation of the image, a representation of the image at a given one of the plurality of successive image levels having a different resolution than that of a representation of the image at a subsequent one of the plurality of successive image levels;
(c) identifying a given one of the image levels at which noise in the image is removed;
(d) setting the initial position as a current contour and the given image level as a current image level;
(e) deforming the current contour at the current image level to expand into an expanded contour matching a shape of the given structure;
(f) setting the expanded contour as the current contour and the subsequent one of the plurality of image levels as the current image level; and
(g) repeating steps (e) and (f) until a last one of the plurality of image levels is reached,
wherein identifying the given one of the image levels comprises:

(h) identifying a selected representation of the image associated with a selected one of the plurality of image levels and at which the image resolution is highest;
(i) defining a region of interest within the selected representation of the image associated with the selected image level;
(j) performing image sample analysis to determine whether noise is present within the region of interest;
(k) if no noise is present within the region of interest, determining that the selected image level is adequate for initiating contour deformation thereat and setting the selected image level as the given one of the image levels; and
(l) otherwise, selecting another one of the plurality of image levels having a lower image resolution than that of the selected image level, setting the other one of the plurality of image levels as the selected image level, and repeating steps (i) to (l) until the last one of the plurality of image levels is reached.

12. The system of claim 11, wherein the at least one application is executable by the processor for defining the region of interest within the representation of the image comprising:
extending a plurality of sampling rays radially away from the initial position;
identifying intersection points between the plurality of sampling rays and edges present in the selected representation of the image;
computing a distance between each one of the intersection points and the initial position and comparing the distance to a first threshold;
removing from the selected representation of the image ones of the intersection points whose distance is beyond the first threshold and retaining other ones of the intersection points;
fitting a sampling circle on retained ones of the intersection points;
discriminating between ones of the edges representative of noise in the selected representation of the image and ones of the edges delimiting a boundary of the given structure in the selected representation of the image;
removing ones of the intersection points that lie on the edges delimiting the boundary of the given structure; and
resizing the sampling circle for only retaining therein the intersection points that lie on the edges representative of noise, the region of interest defined as an area within the resized sampling circle.

13. The system of claim 12, wherein the at least one application is executable by the processor for performing image sample analysis comprising:
assessing whether one or more of the edges are present inside the resized sampling circle;
if no edges are present inside the resized sampling circle, determining that no noise is present within the region of interest;
otherwise, if one or more of the edges are present inside the resized sampling circle,
for each one of the one or more edges present, computing an angular distance of the edge, computing a length of the edge, computing a ratio of the length to the angular distance, comparing the computed ratio to a threshold ratio, retaining the edge within the resized sampling circle if the computed ratio is below the threshold ratio, and otherwise removing the edge from within the resized sampling circle, assessing whether edges remain inside the resized sampling circle, if edges remain inside the resized sampling circle, determining that noise is present within the region of interest, and otherwise, determining that no noise is present within the region of interest.

14. The system of claim 11, wherein the at least one application is executable by the processor for, after setting the expanded contour as the current contour and the subsequent one of the plurality of image levels as the current image level and prior to the deforming, projecting the expanded contour set as the current contour onto the representation of the image associated with the subsequent image level set as the current image level, the deforming comprising deforming the projected expanded contour in the representation of the image associated with the subsequent image level set as the current image level.

15. The system of claim 14, wherein the at least one application is executable by the processor for, after setting the expanded contour as the current contour and the subsequent one of the plurality of image levels as the current image level and prior to the deforming, identifying one or more noisy edges present inside the current contour, the one or more noisy edges representative of noise introduced in the image as a result of the projecting; and removing the one or more noisy edges.

16. The system of claim 15, wherein the at least one application is executable by the processor for, after setting the expanded contour as the current contour and the subsequent one of the plurality of image levels as the current image level and prior to the deforming:

identifying one or more boundary edges delimiting a boundary of the given structure in the image;

sampling the current contour to obtain a pixel-connected contour comprising a plurality of neighboring points;

determining, for each one of the plurality of neighboring points, whether the neighboring point overlaps any one of the one or more boundary edges; and if the point overlaps, moving the point away from the one or more boundary edges along a direction of a normal to the current contour, thereby eliminating the overlap.

17. The system of claim 11, wherein the at least one application is executable by the processor for deforming the current contour at the current image level comprising:

computing a value of a gradient force at each point on the current contour;

computing a distance between each point on the current contour and one or more edges present in the image;

comparing the distance to a third threshold;

if the distance is lower than the third threshold, using the gradient force to displace the current contour; and otherwise, using a force normal to the current contour at each point along the current contour to displace the current contour.

18. The system of claim 17, wherein the at least one application is executable by the processor for using the normal force to displace the current contour comprising:

determining a displacement direction of each point along the current contour;

for each point along the current contour, identifying ones of the one or more edges present in the displacement direction;

discriminating between ones of the one or more edges present in the displacement direction that delineate a boundary of the given structure and ones of the one or more edges present in the displacement direction and representative of noise in the image; and adjusting the normal force in accordance with the distance between each point along the current contour and the one or more edges present in the displacement direction such that a displacement magnitude of the point in the displacement direction causes the current contour to be displaced beyond the one or more edges present in the displacement direction and representative of noise.

19. The system of claim 18, wherein the at least one application is executable by the processor for computing a spacing between the one or more edges present in the displacement direction, comparing the spacing to a tolerance, and, if the spacing is below the tolerance, adjusting the normal force such that the displacement magnitude of the point in the displacement direction prevents the current contour from entering the spacing between the one or more edges.

20. The system of claim 11, wherein the at least one application is executable by the processor for obtaining the initial position comprising one of randomly determining a point inside a boundary of the given structure in the image and receiving a user-defined selection of the initial position.

21. A non-transitory computer readable medium having stored thereon program code executable by a processor for active contour segmentation of imaging data, the program code executable for:

(a) receiving at least one image for a given structure and obtaining an initial position on the image;

for each one of the at least one image, (b) computing a multi-scale image representation comprising a plurality of successive image levels each having associated therewith a representation of the image, a representation of the image at a given one of the plurality of successive image levels having a different resolution than that of a representation of the image at a subsequent one of the plurality of successive image levels;

(c) identifying a given one of the image levels at which noise in the image is removed;

(d) setting the initial position as a current contour and the given image level as a current image level;

(e) deforming the current contour at the current image level to expand into an expanded contour matching a shape of the given structure;

(f) setting the expanded contour as the current contour and the subsequent one of the plurality of image levels as the current image level; and (g) repeating steps (e) and (f) until a last one of the plurality of image levels is reached, wherein identifying the given one of the image levels comprises:

(h) identifying a selected representation of the image associated with a selected one of the plurality of image levels and at which the image resolution is highest;

(i) defining a region of interest within the selected representation of the image;

(j) performing image sample analysis to determine whether noise is present within the region of interest;

(k) if no noise is present within the region of interest, determining that the selected image level is adequate for initiating contour deformation thereat and setting the selected image level as the given one of the image levels; and (l) otherwise, selecting another one of the plurality of image levels having a lower image resolution than that of the selected image level, setting the other one of the plurality of image levels as the selected image level, and repeating steps (i) to (l) until the last one of the plurality of image levels is reached.

* * * * *